United States Patent
Shimoda et al.

(10) Patent No.: US 6,894,955 B1
(45) Date of Patent: May 17, 2005

(54) QUICK ACCESS INFORMATION READ AND WRITE DEVICES

(75) Inventors: Yoshitaka Shimoda, Saitama-ken (JP); Masayoshi Yoshida, Saitama-ken (JP); Shinichi Nagahara, Saitama-ken (JP); Tsuyoshi Hasebe, Saitama-ken (JP); Motoji Nakamura, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 908 days.

(21) Appl. No.: 09/675,059

(22) Filed: Sep. 29, 2000

(30) Foreign Application Priority Data

Oct. 12, 1999 (JP) ............................................ 11-290225

(51) Int. Cl.[7] .............................. G11B 7/09; G11B 7/18
(52) U.S. Cl. ................................ 369/44.11; 369/44.26; 369/44.38; 369/112.12; 369/112.17; 369/44.28
(58) Field of Search .......................... 369/44.28, 44.41, 369/47.17, 44.11, 44.26, 112.12, 112.17

(56) References Cited

U.S. PATENT DOCUMENTS

| | | | | |
|---|---|---|---|---|
| 5,216,652 A | * | 6/1993 | Yoshio et al. ............. | 369/44.37 |
| 5,434,834 A | * | 7/1995 | Shinoda et al. .......... | 369/44.13 |
| 5,671,199 A | * | 9/1997 | Nishikawa ............... | 369/44.26 |
| 5,815,473 A | * | 9/1998 | Takahashi et al. ....... | 369/44.26 |
| 5,963,515 A | * | 10/1999 | Shindo .................... | 369/44.23 |
| 6,218,655 B1 | * | 4/2001 | Ogasawara et al. ...... | 250/201.5 |
| 6,282,164 B1 | * | 8/2001 | Katayama .............. | 369/112.12 |
| 6,388,963 B1 | * | 5/2002 | Tanaka .................... | 369/44.26 |

FOREIGN PATENT DOCUMENTS

| | | |
|---|---|---|
| EP | 0 323 320 A2 | 7/1989 |
| EP | 0 330 481 A2 | 8/1989 |
| EP | 0704 841 A1 | 4/1996 |

OTHER PUBLICATIONS

Abstract Only JP 05 101420, M. Nobuhide, Apr. 23, 1993.

* cited by examiner

Primary Examiner—Aristotelis M. Psitos
(74) Attorney, Agent, or Firm—Arent Fox PLLC

(57) ABSTRACT

There are provided an information write device and an information read device enabling to generate highly accurate contrast signals. When a main light spot Pc is located at the center of the a groove G, the light spot Pc and sub light spots Psa, Psb are each adapted to radiate a disc DSC such that the sub light spots Psa, Psb radiate positions displaced from the center of the land L. The reflected beams of light from the disc DSC caused by the radiation with the light spots Pc, Psa, Psb are detected to generate push-pull signals each corresponding to the light spots Pc, Psa, Psb, respectively, in accordance with each of the detected signals. Furthermore, a signal to be obtained by amplifying an addition signal, given by adding the push-pull signals each corresponding to the sub light spots Psa, Psb, with a predetermined amplification factor K/n, and a push-pull signal corresponding to the main light spot Pc are added to thereby generate a contrast signal.

14 Claims, 18 Drawing Sheets

(a)

(b)

$$\begin{pmatrix} \theta_0 \neq \theta_a, & \theta_0 \neq \theta_b, & \theta_a \neq \theta_b \\ \eta_0 \neq \eta_a, & \eta_0 \neq \eta_b, & \eta_a \neq \eta_b \end{pmatrix}$$

(a)

(b)

$$\begin{pmatrix} \theta_0 = \theta_a = \theta_b \\ \eta_a = \eta_b, \; \eta_0 \neq \eta_a, \; \eta_0 \neq \eta_b \end{pmatrix}$$

(a)

(b)

QUICK ACCESS INFORMATION READ AND WRITE DEVICES

BACKGROUND OF THE INVENTION

The present invention relates to an information write device and an information read device, for use with information recording media such as a CD-R, DVD-R, or DVD-RW. More particularly, it relates to an information write device and an information read device which are provided with quick access to an information recording medium upon reading and writing.

As is well known, read-only (reproduction-dedicated) CD-ROMs have become widespread, followed by the development of information recording media such as a CD-R and DVD-R (onto which records can be appended) and a rewritable DVD-RW.

These information recording media such as an information writable (recordable) CD-R, DVD-R, and DVD-RW comprise grooves G and guide lands L, which are provided with a predetermined width, arranged adjacent to each other, and formed as spiral ltracks. The media are adapted to allow contents information such as video and audio information to be optically recorded onto the aforementioned grooves G.

On the other hand, information write devices and information read devices which employ these information recording media are provided with an optical pickup (not shown) for radiating the grooves C with a write or read light spot Pc as illustrated schematically in FIG. 17. Upon writing or reading information, the optical pickup is servo-controlled for tracking to allow the light spot Pc to be positioned on and linearly scan over the grooves G.

A tracking error signal is employed for carrying out the tracking servo control. A pair of optical detectors are arranged in parallel to each other in a radial direction $\theta r$ (perpendicular to the direction of linear scan $\theta s$). An information recording medium is radiated with the light spot Pc to produce a reflected beam of light, which is in turn received separately by each of the optical detectors. A difference between the detection signals detected by each of the optical detectors is also determined to generate a tracking error signal. Then, the optical pickup is servo-controlled so that the tracking error signal has a voltage of 0 volt, thereby positioning the light spot Pc on the grooves G.

More specifically, this is schematically illustrated in FIG. 18. The optical pickup is provided with an objective lens OBL for generating the light spot Pc. The farther the objective lens OBL is positioned apart from the center r1 of a groove G1 toward the right (in the portion illustrated as range B), the greater the amplitude of the tracking error signal STE becomes in plus voltages. On the other hand, the farther the objective lens OBL is positioned apart from the center r1 of a groove G1 toward the left (in the portion illustrated as range A), the greater the amplitude of the tracking error signal STE becomes in minus voltages.

When the tracking error signal STE swings to a plus or minus voltage as such, servo control is carried out such that a predetermined actuator is initiated to displace the objective lens OBL toward the center r1 to make those voltages 0 volt, thereby positioning the light spot Pc on the center r1 of the groove G1.

That is, the tracking servo control is carried out such that the tracking error signal STE has a value of 0 volt, with the ranges A and B taken as a focus retract region in a half cycle in which the tracking error signal STE takes on the maximum plus and minus amplitude.

In addition, these CD-R, DVD-R, and DVD-R have a good function as an information recording medium which enables random access. To implement the random access, the information write device and the information read device release temporarily the aforementioned tracking servo control to move the optical pickup to the vicinity of the target position in the radial direction $\theta r$ under this condition and thereafter restart the tracking servo control to position the optical pickup at the original target position.

For example, suppose that the objective lens OBL oriented to the aforementioned groove G1 is moved to the center (the target position) r2 of the groove G2. In this case, the pickup is moved at once to a proximal position rf near the center r2 with the tracking servo control being released. However, the proximal position rf is set to be within the lock range in the groove G2. Then, the tracking servo control is restarted to thereby position the light spot Pc at the center r2 on the groove G2 so that the tracking error signal STE has a voltage of 0 volt within the lock range indicated by the region C and D.

At this point, the circuit as shown in FIG. 19 was employed to determine whether the pickup reached the aforementioned proximal position rf. That is, the aforementioned optical detector detects the reflected beams of light generated when the main light spot Pc crosses the groove G and the land L alternately, and the RF signal SRF generated from the detected signal as shown in FIG. 20(a) is supplied to an envelope detector 100, thereby generating an envelope signal STB as shown in FIG. 20(b). Furthermore, the envelope signal STB is supplied to a comparator 102 to be compared with a predetermined threshold THD, thereby generating a binary encoded contrast signal SRC as shown in FIG. 20(c). Then, the position to which the pickup is to be moved is determined in accordance with a count Value Scn obtained by counting the contrast signal SRC with a counter 104.

However, when a non-recorded area where no information has been recorded is randomly accessed, the aforementioned prior-art information write device and information read device were not able to obtain the contrast signal SRC with accuracy. Thus, in some cases, it was difficult to move the pickup quickly to the target position with accuracy.

That is, the groove G of the non-recorded area where no pits have been formed yet made a difference in intensity smaller between the reflected beam of light from the groove C and that from the land L. Thus, in some cases, it was not possible to obtain the contrast signal SRC which can clearly distinguish the groove G from the land L.

In particular, when warping or strain exists in the non-recorded area of the information recording medium, a noise component of low frequency caused by the warping or the strain was to be superimposed on the RF signal SRF and the envelope signal STB. Consider a case where the noise component of low frequency was greater in amplitude than the reflected signal component from the groove G and the land L. When the envelope signal STB was supplied to the comparator 102 to be compared with the threshold THD, an adverse effect would occur such that the aforementioned noise component was accidentally determined to be the groove G or the land L. Thus, in some cases, it was impossible to obtain the contrast signal SRC which can clearly distinguish the groove G from the land L. Consequently, in some cases, it was impossible to move the pickup quickly to the target position with accuracy.

SUMMARY OF THE INVENTION

The present invention was developed in view of the aforementioned problems present in the prior art. An object of the present invention is to provide an information write device and an information read device which enable high-speed access for writing or reading information by moving the pickup quickly to the desired target position with accuracy when the pickup is to be moved in the radial direction across the information recording medium.

To achieve the aforementioned object, the information write device and the information read device according to the present invention comprises optical system means for radiating information recording tracks and guide tracks with at least two light spots; optical detector means for detecting each of reflected beams of light generated by the radiation of each of the light spots; a pickup for moving the optical system means along a direction of arrangement of the information recording tracks and the guide tracks; signal generating means for generating each of push-pull signals in accordance with each of detection signals outputted from the optical detector means when the pickup moves along the direction of arrangement of the information recording tracks and the guide tracks; and operational means for generating a contrast signal, having contrast information in the direction of arrangement of the information recording tracks and the guide tracks, by adding the push-pull signals corresponding to the at least two light spots. The information write device and the information read device are characterized in that the optical system means allows one of the at least two light spots to radiate the information recording track and at the same time the other light spot to radiate a portion displaced from the center of the information recording track or the guide track.

According to such a configuration, when one of the at least two light spots is located at the center of the information recording track, the remaining light spot is adapted to radiate a position dislocated from the center of the guide track.

The remaining light spot radiates the dislocated position as such, and push-pull signals are each generated in accordance with each of the resulting reflected beams of light and then added. Accordingly, a contrast signal which specifies the shape of the information recording track and the guide track is generated without causing the push-pull signals to cancel out one another because the remaining light spot radiates the position dislocated from the center of the guide track. Consequently, when random access is carried out, the contrast signal can be applied to accurately know the position to which the pickup is to be moved. In addition, when the pickup is moved to the non-recorded area where no information has been recorded on the information recording track, the aforementioned contrast signal specifies the information regarding the shape of the information recording track and the guide track. Thus, the pickup can be moved quickly to the target position with accuracy.

Furthermore, the information read device and information write device further comprise amplifier means for adding and amplifying, with a predetermined amplification factor, push-pull signals corresponding to remaining light spots except for a push-pull signal corresponding to one of the at least two light spots; and subtracter means for performing subtraction between the signal amplified by the amplifier means and the push-pull signal corresponding to the one of the at least two light spots. The devices are characterized in that the signal generated by the subtracter means is employed as a tracking error signal to perform tracking servo control on the pickup.

Furthermore, The devices are characterized in that the amplification factor is set to a ratio K/n, in which K is a ratio of intensity of a remaining light spot to intensity of said one light spot, n is the number of said remaining light spots.

Setting the amplification factor of the amplifier means as such makes it possible to generate the contrast signal which specifies the information regarding the shape of the information recording track and the guide track. That is, such a contrast signal can be obtained which provides a clear contrast between the information recording track and the guide track.

BRIEF DESCRIPTION OF THE DRAWINGS

The present invention, together with objects and advantages thereof, may be better understood through the following description of the preferred embodiments with reference to the accompanying drawings in which.

DETAILED DESCRIPTION OF THE PREFERRED EMBODIMENTS

Embodiments of the present invention will be explained below with reference to the accompanying drawings. As an embodiment, an information write device and an information read device are explained which employ an information recording medium (hereinafter referred to as a disc) with a recording surface having grooves G and lands L formed thereon as spiral tracks. The information recording medium includes the CD-R (a compact disc on which records can be appended), the DVD-R (a digital video disc or a digital versatile disc, on which records can be appended), the DVD-RW (a rewritable digital video disc or digital versatile disc).

Figure 1:
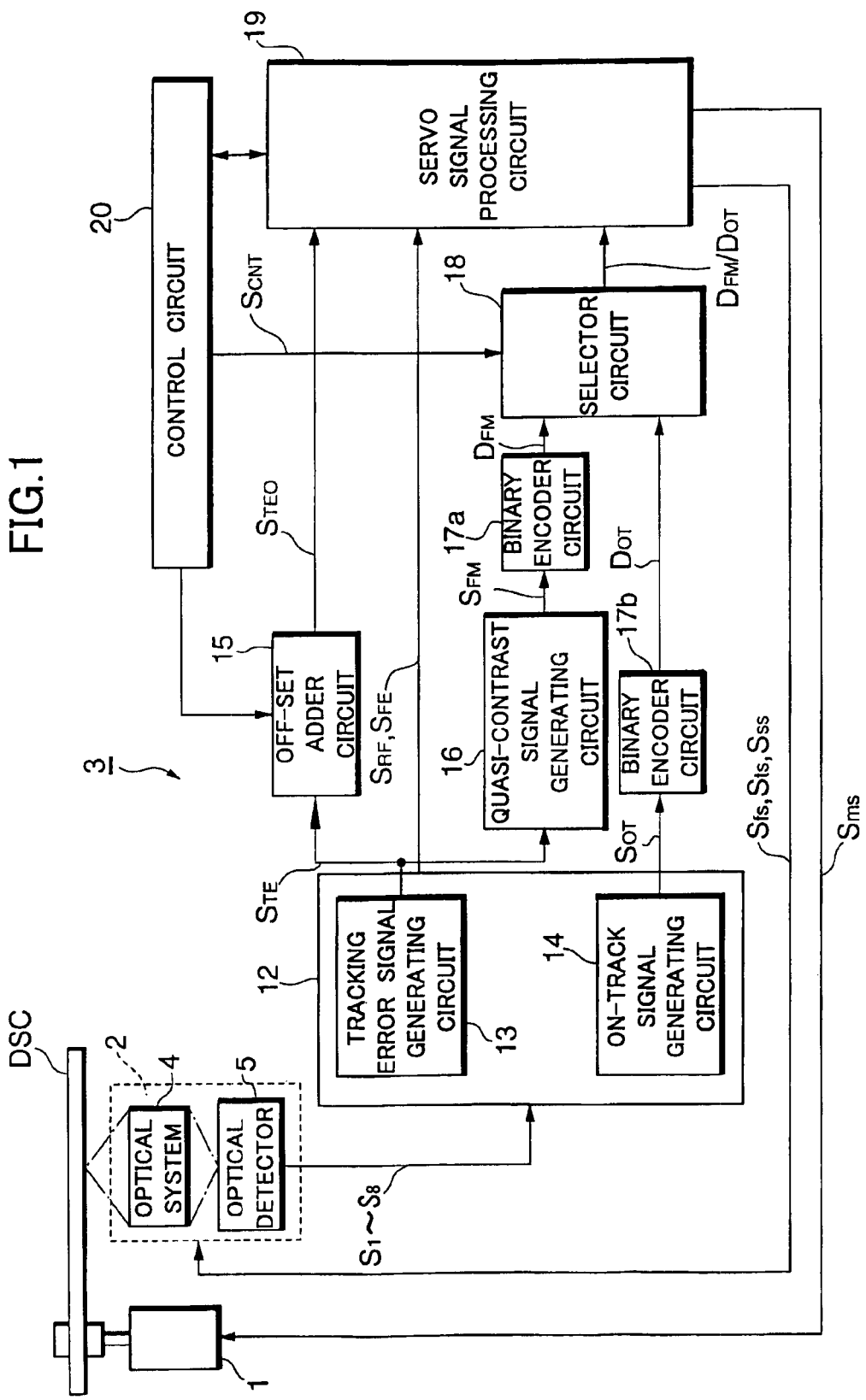
FIG. 1 is a block diagram illustrating the configuration of a signal processing circuit and a pickup according to an embodiment.

FIG. 1 is a block diagram illustrating the main portion of an information write device and an information read device according to this embodiment. Referring to the FIG. 1, provided are a spindle motor 1 for rotating a disc DSC at a predetermined linear speed, an pickup 2, and a signal processing circuit 3.

The pickup 2 is provided with an optical system 4 and an optical detector 5. The optical system 4 radiates the recording surface of the disc DSC with a main light spot Pc and sub light spots Psa, Psb (which will be described later), and condenses each of reflected beams of light Pcr, Psar, Psbr, which are caused by the radiation. The optical detector 5 detects each of the condensed reflected beams of light Pcr, Psar, Psbr.

Figure 2:
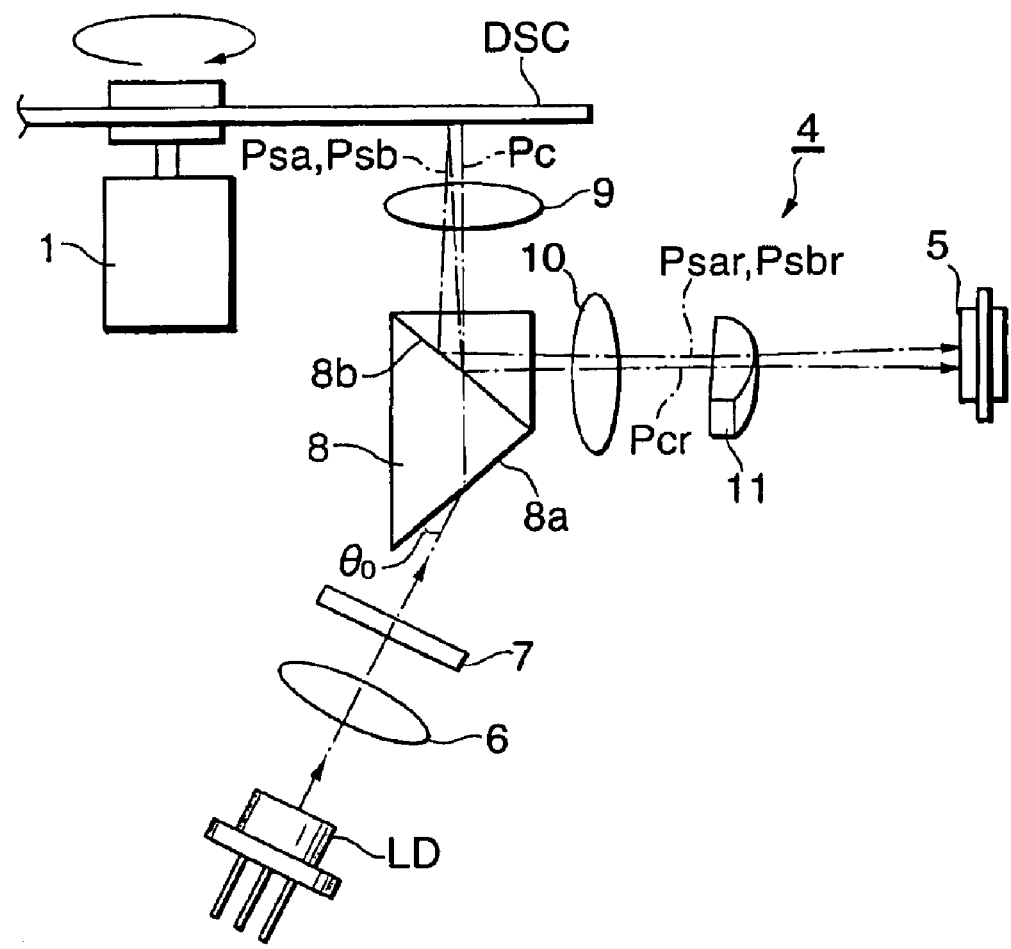
FIG. 2 is a view illustrating the configuration of an optical system provided for the pickup.

More specifically, as shown in FIG. 2, the optical system 4 is provided with a semiconductor laser LD, a collimator lens 6, a transmissive grating 7, a beam splitter 8 formed of prisms, an objective lens 9, a convex lens 10, and a cylindrical lens 11.

The collimator lens 6 collimates a laser beam of a predetermined wavelength $\lambda$ entitled from the semiconductor laser LD to radiate the grating 7 therewith.

The grating 7 has parallel equidistant slits spaced apart by a predetermined spacing d to diffract the collimated beam of light from the collimator lens 6 with the slits and then emit the diffracted beam to a light receiving surface 8a of the beam splitter 8.

Here, this embodiment makes use of the zero order beam (for use as a main light spot Pc) and the plus/minus first order beam (for use as a pair of sub light spots Psa, Psb), which are produced by the aforementioned slits to carry out tracking servo control by the three-beam method. For this reason, explanation is given below only to the zero order and plus/minus first order beams.

The beam splitter 8 comprises the light receiving surface 8a which is inclined at a predetermined angle of $\theta o$ relative to the optical axes of the semiconductor laser LD and the collimator lens 6 and to the normal direction of the grating 7, and a joint surface 8b which serves as a half mirror. With this configuration, the beam splitter 8 allows the zero order and plus/minus first order beams from the grating 7 to be incident on the light receiving surface 8a and refracted, and then transmitted toward the objective lens 9 via the joint surface 8b.

The objective lens 9 converges the zero order and plus/minus first order beams, transmitted from the beam splitter 8, to radiate the recording surface of the disc DSC with the zero order beam employed as a main light spot Pc and the plus/minus first order beams employed as a pair of sub light spots Psa, Psb. The objective lens 9 also condenses and transmits, toward the beam splitter 8, each of the reflected beams Pcr, Psar, Psbr from the disc DSC, resulted from the radiation with the main light spot Pc and the sub light spots Psa, Psb. Then, each of the reflected beams Pcr, Psar, Psbr are incident on the beam splitter 8 and then reflected at the joint surface 8b, thereby being transmitted toward the convex lens 10.

The convex lens 10 converges each of the reflected beams Pcr, Psar, Psbr from the beam splitter 8, while the cylindrical lens 11 causes astigmatism to occur in each of the reflected beams Pcr, Psar, Psbr, which have been converged with the convex lens 10, for the detection of focus. Then, the reflected beams Pcr, Psar, Psbr are transmitted to the light-receiving surface of the optical detector 5.

Figure 3:
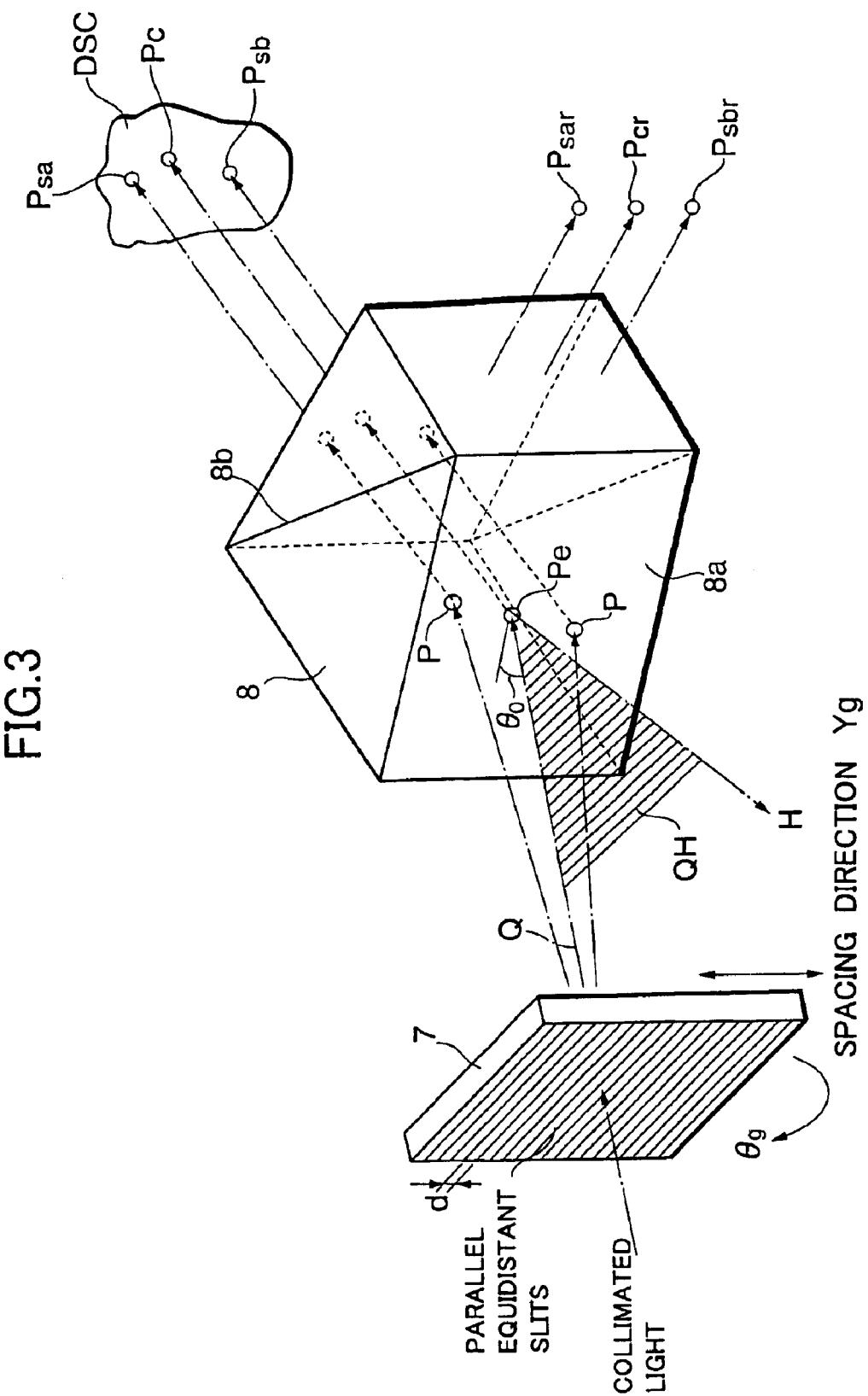
FIG. 3 is a perspective view illustrating schematically the configuration of a grating and a beam splitter provided for the optical system.
Figure 4:
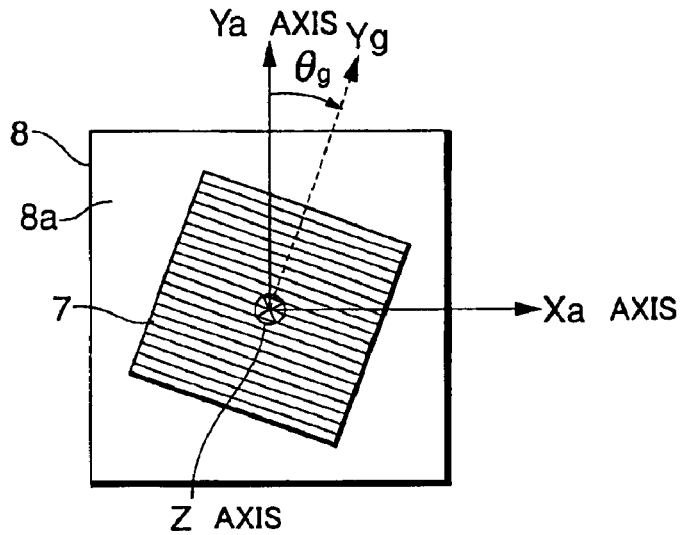
FIG. 4 is an explanatory view illustrating the principle of generating the light spots which are generated by the optical system.
Figure 4:
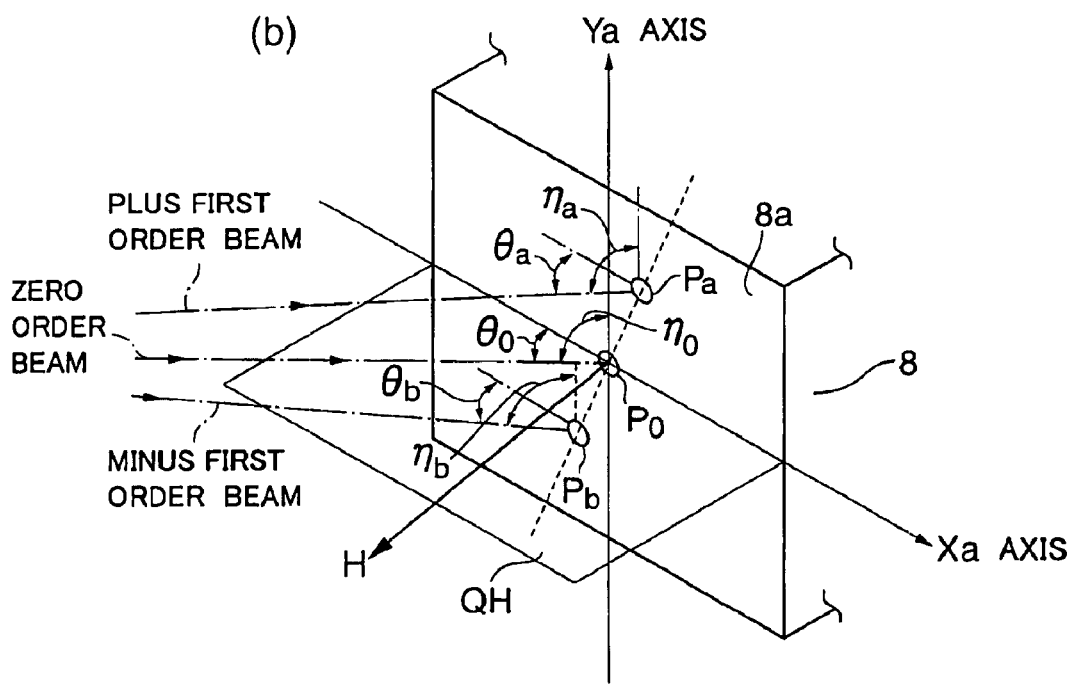
Figure 5:
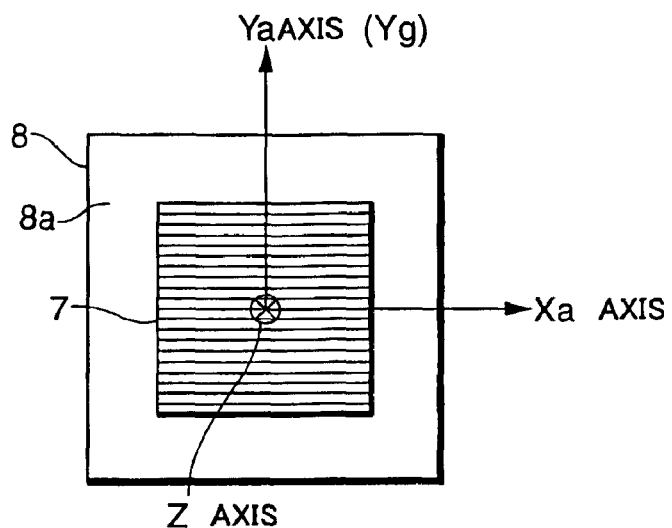
FIG. 5 is another explanatory view illustrating the principle of generating the light spots which are generated by the optical system.
Figure 5:
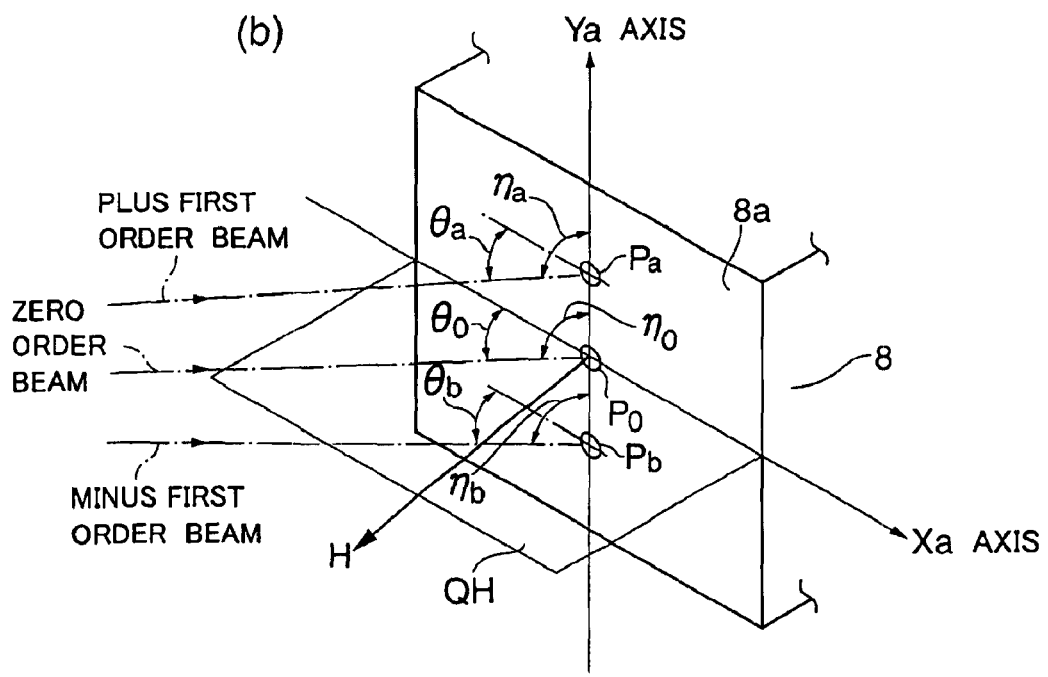
Figure 6:
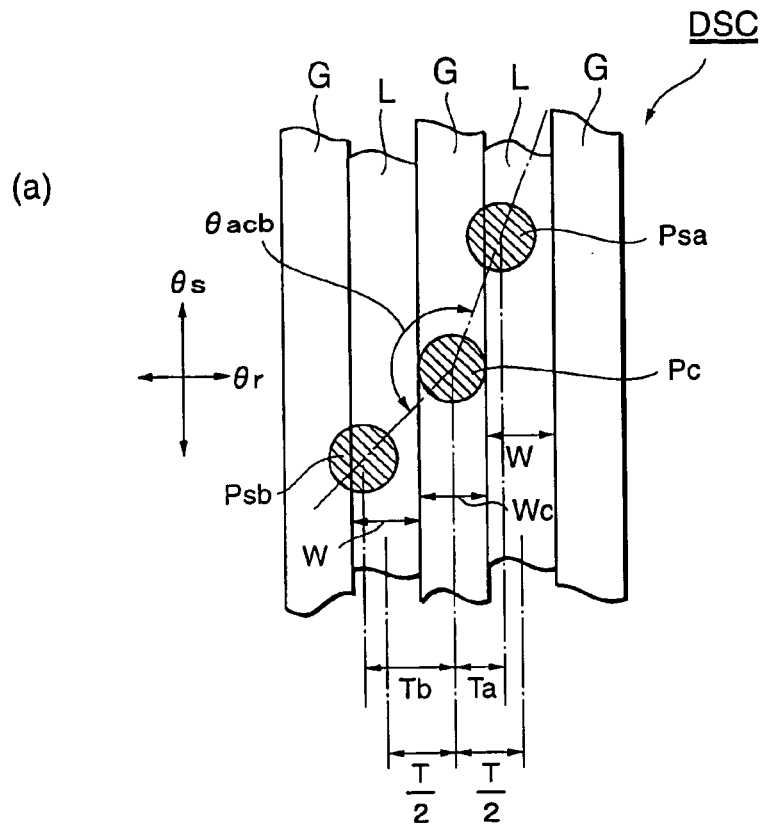
FIG. 6 is an explanatory view illustrating the positional relationship between the light spots which are generated by the optical system.
Figure 6:
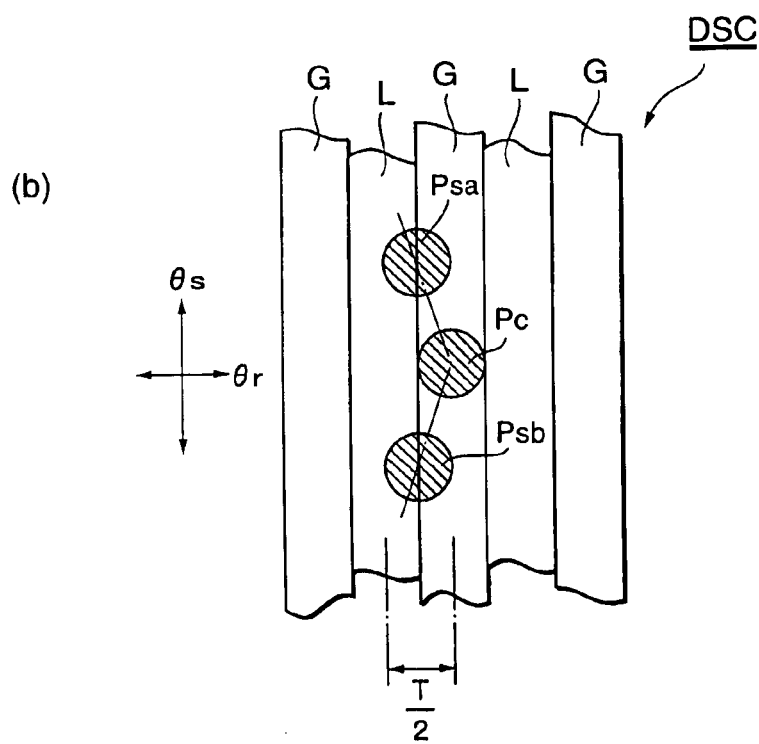

FIG. 3 is a perspective view illustrating in detail the geometric configuration of the grating 7 and the beam splitter 8. FIGS. 4 to 6 are explanatory views illustrating the principle of generation of the main light spot Pc and the sub light spots Psa, Psb.

Referring to FIG. 3, as described in the foregoing, the light receiving surface 8a of the beam splitter 8 is inclined at the predetermined angle of $\theta o$ relative to the optical axes of the semiconductor laser LD and the collimator lens 6 and to the normal direction of the grating 7.

In addition, the direction Yg along the spacing of the slits of the grating 7 is inclined at a predetermined angle of $\theta g$ relative to an imaginary plane QH which includes the normal direction H and an optical path Q of the zero order beam Po at the position where the zero order beam Po is incident on the light receiving surface 8a.

As shown in FIG. 4(a), suppose that the direction of the optical path Q of the zero order beam Po (the same direction of the normal direction of the grating 7) is Z axis, the direction of the intersection defined by the imaginary plane QH and the light receiving surface 8a is Xa axis, and the direction perpendicular to the imaginary plane QH is Ya axis. In this case, the direction Yg along the spacing of the slits of the grating 7 is inclined at an angle of $\theta g$ relative to the Ya axis.

Accordingly, as shown in FIG. 4(b), the zero order beam Po is incident on the light receiving surface 8a at an angle of $\theta o$ relative to the Xa axis and at an angle of $\eta o$ relative to the Ya axis. Moreover, the plus first order beam Pa is diffracted at an angle of diffraction determined by the wavelength $\lambda$ of the laser beam and the spacing d of the slits, so as to be incident on the light receiving surface 8a at an incidence angle $\theta a$ relative to the Xa axis and an incidence angle $\eta a$ relative to the Ya axis. On the other hand, the minus first order beam Pb is diffracted at an angle of diffraction determined by the wavelength $\lambda$ of the laser beam and the spacing d of the slits to be incident on the light receiving surface 8a at an incidence angle $\theta b$ relative to the Xa axis and an incidence angle $\eta b$ relative to the Ya axis, where 74 o≠θa, θo≠θb, θa≠θb, ηo≠ηa, ηo≠ηb, and ηa≠ηb.

As such, the zero order beam Po and the plus/minus first order beams Pa, Pb are incident on the light receiving surface 8a at incidence angles different from one another and thus refracted on the tight receiving surface 8a at different refraction angles, so as to be incident on the beam splitter 8. Then, the zero order beam Po and the plus/minus first order beams Pa, Pb each travel in different directions through the beam splitter 8. Subsequently, as shown in FIG. 6(a), each radiates the recording surface of the disc DSC as the main light spot Pc and sub light spots Psa, Psb.

What should be noted here is that the sub light spots Psa, Psb radiate the recording surface of the disc DSC at a predetermined angle of $\theta acb$ ($0° < \theta acb < 180°$) about the main light spot Pc since the zero order beam Po and the plus/minus first order beams Pa, Pb each are incident at different angles of incidence and refracted at different angles of refraction relative to the aforementioned Xa and Ya axes.

Consequently, when the main light spot Pc lies at the center of the groove G, the sub light spot Psa sits on a position shifted from the center of the land L toward the groove G and the sub light spot Psb sits on a position shifted from the center of the land L away from the groove G.

That is, the distance Ta between the sub light spot Psa and the main light spot Pc is expressed by equation (1) below and the distance Tb between the sub light spot Psb and the main light spot Pc is expressed by equation (2) below, where Wc is the width of the groove G, W is the width of the land L, and T/2 is the pitch of the groove G and the land L in the radial direction of θr.

$$Wc/2 < Ta < T/2 \tag{1}$$

$$T/2 < Tb < (W+T)/2 \tag{2}$$

However, the positional relationship between the sub light spot and the main light spot needs not necessarily to satisfy the conditions of the aforementioned equations (1) and (2). What is essential is that the sub light spot is shifted from the center of the groove G or the land L when the main light spot lies at the center of the groove G.

As shown in FIG. 5(a), suppose that the direction Yg along the spacing of the slits of the grating 7 coincides with the direction of the Ya axis or the grating 7 is not rotated (where θg=0°). In this case, as shown in FIG. 5(b), the angle of incidence of the zero order beam Po, the plus first order beam Pa, and the minus first order beam Pb relative to the Xa axis is given such that θ0=θa=θb. On the other hand, the angle of incidence relative to the Ya axis is given such that ηa=ηb, ηo≠ηa, and ηo≠ηb. Suppose that the direction Yg along the spacing of the slits of the grating 7 coincides with the direction of the Ya axis. In this case, the sub light spots Psa, Psb are rotated about the main light spot Pc to radiate the recording surface of the disc DSC in a straight line as shown in FIG. 6(b), not as shown in FIG. 6(a).

As shown in FIG. 6(a) and equations (1), (2) above, this embodiment is characterized in that the grating 7 and the beam splitter 8, arranged as shown in FIGS. 4(a) and (b), are adapted to allow each of the sub light spots Psa, Psb to radiate a position shifted in the direction of θr about the main light spot Pc.

Figure 7:
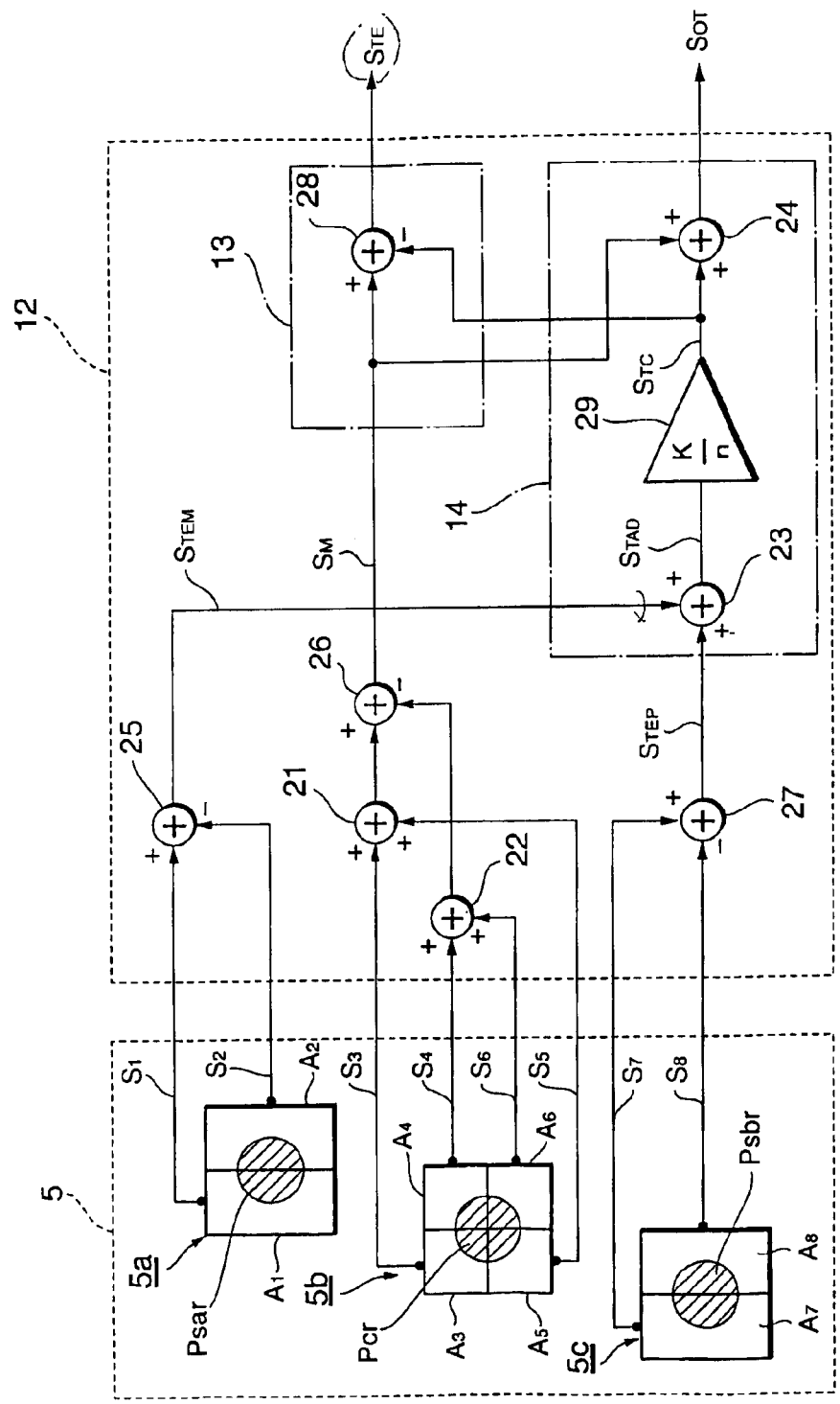
FIG. 7 is a block diagram illustrating the configuration of an optical detector and signal generating circuits.

Next, the configuration of the optical detector 5 and the signal processing circuit 3 will be explained with reference to FIGS. 1, 7 and 8. As shown in FIG. 7, the optical detector 5 comprises a first optical detector 5a for receiving a reflected beam of light Psar corresponding to the sub light spot Psa, a second optical detector 5b for receiving a reflected beam of light Pcr corresponding to the main light spot Pc, and a third optical detector 5c for receiving a reflected beam of light Psbr corresponding to the sub light spot Psb.

The first optical detector 5a comprises two-way split light-receiving areas A1, A2, having the same shape, and is so arranged as to receive the reflected beam Psar separately with these light-receiving areas A1, A2. The second optical detector 5b comprises four-way split light-receiving areas A3–A6, having the same shape, and is so arranged as to receive the reflected beam Pcr separately with these light-receiving areas A3–A6. The third optical detector 5c comprises two-way split light-receiving areas A7, A8, having the same shape, and is so arranged as to receive the reflected beam Psbr separately with these light-receiving areas A7, A8. Detection signals S1–S8 which are detected with these light-receiving areas A1–A8 are adapted to be supplied to a signal processing circuit 12.

As shown in FIG. 1, the signal processing circuit 3 comprises the signal generating circuit 12 having a tracking error signal generating circuit 13 and an on-track signal generating circuit 14, an off-set adder circuit 15 a quasi-contrast signal generating circuit 16 binary encoder circuits 17a, 17b, a selector circuit 18, a servo signal processing circuit 19, and a control circuit 20.

As shown in FIG. 7, the signal generating circuit 12 comprises a plurality of adders 21 to 24, subtracters 25 to 28, and an amplifier 29. The subtracter 28 constitutes the aforementioned tracking error signal generating circuit 13, and the adders 23, 24 and the amplifier 29 constitutes the aforementioned on-track signal generating circuit 14.

The adder 25 operates the difference between the detection signals S1, S2 outputted from the first optical detector 5a, thereby generating a push-pull signal STEM (=S1–S2) corresponding to the reflected beam Psar.

The adders 21, 22 and the subtracter 26 perform addition and subtraction operation on the detection signals S3–S6 outputted from the second optical detector 5b, thereby generating a push-pull signal SM (=S3+S5–S4–S6) corresponding to the reflected beam Pcr.

The subtracter 27 operates the difference between the detection signals S7 and S8 outputted from the third optical detector 5c, thereby generating a push-pull signal STEP (=S7–S8) corresponding to the reflected beam Psbr.

The adder 23 adds the Push-pull signal STEM to STEP, thereby generating an addition signal STAD (=S1–S2+S7–S8).

The amplifier 29 has an amplification factor set to K/n and generates an amplitude correction signal STC (=S1–S2+S7–S8)×K/n) by amplifying the addition signal STAD with the amplification factor of K/n. Here, the coefficient K is set in advance to the ratio between the intensity of the zero order beam and that of the plus first order beam (or minus first order beam), while the coefficient n is set to the number of sub light spots. In this embodiment, n is set to 2 since the two sub light spots Psa, Psb are employed.

The adder 24 adds the amplitude correction signal STC to the push-pull signal SM, thereby generating an on-track signal SOT. That is, the on-track signal generating circuit 14 comprising the amplifier 29 and the adder 24 generates the on-track signal SOT (=(S3+S5–S4–S6)+(S1–S2+S7–S8)×K/n).

The tracking error signal generating circuit 13 or the subtracter 28 operates the difference between the push-pull signal SM and the amplitude correction signal STC, thereby generating the tracking error signal STE (=(S3+S5–S4–S6)–(S1–S2+S7–S8)×K/n).

Here, though not shown, the detection signals S3 to S6 outputted from the second optical detector 5b are added together, thereby generating a RF signal SRF (=S3+S4+S5+S6). The difference between the addition signal (S3+5) of the detection signals S3, S5 and the addition signal (S4+S6) of the detection signals S4, S6 is operated, thereby generating a focus error signal SFE (=S3+S6–S4–S5). Then, the RF signal SRF and the focus error signal SFE are supplied to the servo signal processing circuit 19.

The off-set adder circuit 15 adds a predetermined direct current component (an amplitude component) to the tracking error signal STE, thereby eliminating off-set components contained in the tracking error signal STE to supply a tracking error signal STEO containing no off-set components to the servo signal processing circuit 19.

To allow the pickup 2 to jump over multiple tracks from inner toward outer circumference of the disc DSC, the quasi-contrast signal generating circuit 16 delays the phase of the tracking error signal STE by 90° to invert the polarity thereof, thereby generating a quasi-contrast signal SFM.

Moreover, to allow the pickup 2 to jump over multiple tracks from outer toward inner circumference of the disc DSC, the quasi-contrast signal generating circuit 16 delays the phase of the tracking error signal STE by 90°, thereby generating a quasi-contrast signal SFM. Then, the quasi-contrast signal SFM is supplied to the binary encoder circuit 17a.

Both the binary encoder circuits 17a, 17b are made up of zero-cross detectors.

The binary encoder circuit 17a generates and supplies a binary quasi-contrast signal DFM to the selector circuit 18. The binary quasi-contrast signal DFM takes on logic "H" when the amplitude of the quasi-contrast signal SFM swings toward the plus side, whereas taking on logic "L" when the amplitude of the quasi-contrast signal SFM swings toward the minus side. The binary encoder circuit 17b generates and supplies a binary on-track signal DOT to the selector circuit 18. The binary on-track signal DOT takes on logic "H" when the amplitude of the on-track signal SOT swings toward the plus side, whereas taking on logic "L" when the amplitude of the on-track signal SOT swings toward the minus side.

The selector circuit 18 is made up of switching elements such as analog switches, and selectively transfers either the binary quasi-contrast signal DFM or the binary on-track signal DOT to the servo signal processing circuit 19 in accordance with a control signal from the control circuit 20.

The servo signal processing circuit 19 generates a rotation servo signal Sms for controlling the rotational speed of the spindle motor 1 and servo signals such as Sfs, Sts, Sss for conducting control such as focus servo control, tacking servo control, and skew servo control, in accordance with the binary quasi-contrast signal DFM or the binary on-track signal DOT, the RF signal SRF, the focus error signal SFE, and the tracking error signal STEO.

Figure 8:
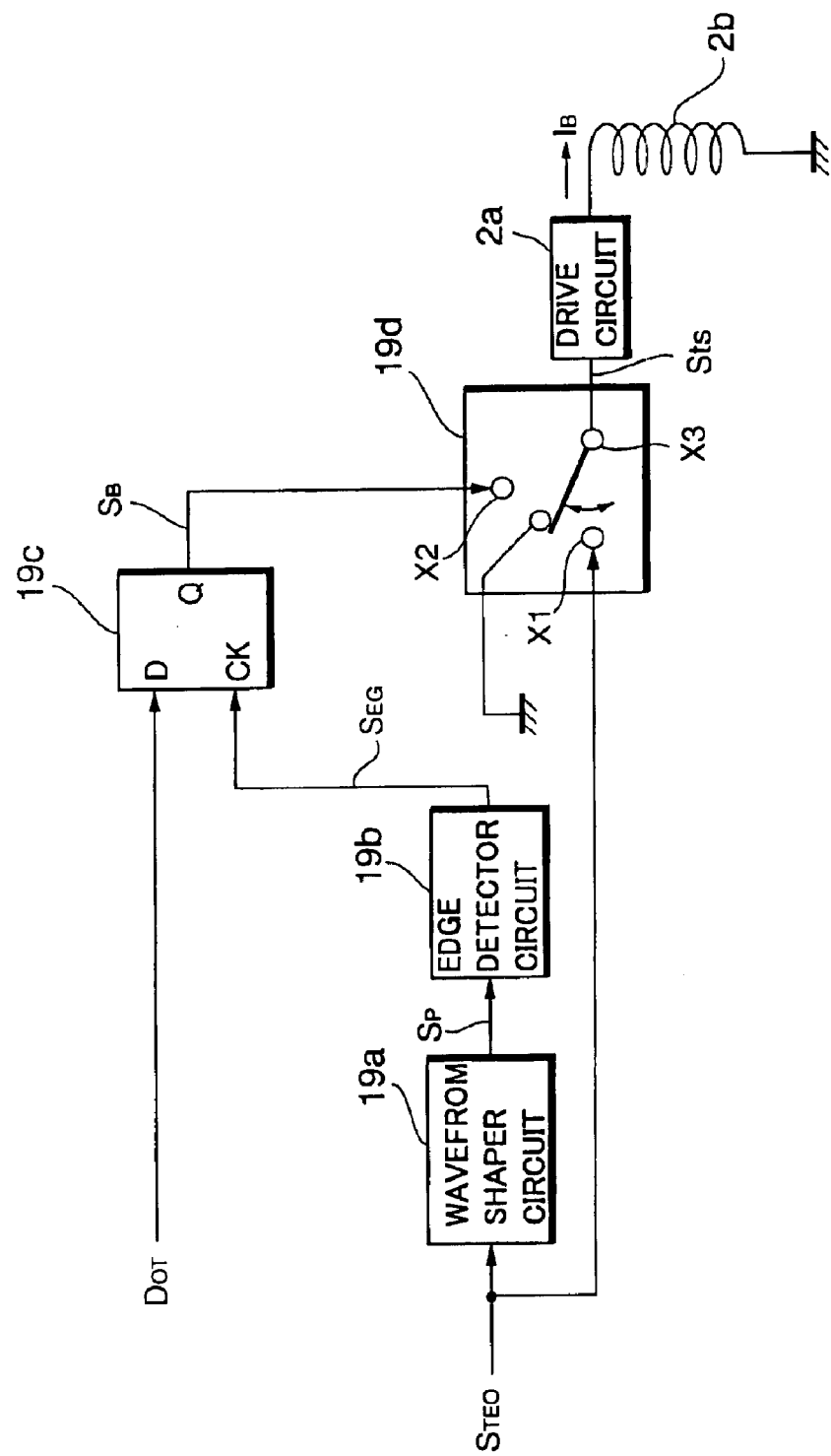
FIG. 8 is a block diagram illustrating the configuration of a brake control circuit.

FIG. 8 is a block diagram illustrating the configuration of a brake control circuit which is provided in the servo signal processing circuit 19 and moves the main light spot Pc quickly with accuracy to the desired groove G at the time of jumping over multiple tracks (to be detailed later).

Referring to FIG. 8, a waveform shaper circuit 19a shapes the waveform of the tracking error signal STEO, thereby generating a binary-encoded rectangular signal SP. An edge detector circuit 19b detects the edge of the rectangular signal SP, thereby generating a pulse signal SEG in synchronization with the rise and fall edge of the rectangular signal SP.

The on-track signal DOT is supplied to the input terminal D (the data input terminal) of the D flip flop 19c, while the pulse signal SEG is supplied to the input terminal CK (clock input terminal). This allows The D flip flop 19c to generate and outputs a rectangular signal SB in synchronization with the on-track signal DOT and the pulse signal SEG to a control contact x2 of an analog switch 19d.

The aforementioned tracking error signal STEO is supplied to an input contact x1 of the analog switch 19d. There is connected a drive circuit 2a for generating a brake control current IB between an output contact x3 of the analog switch 19d and a drive coil 2d for driving the objective lens 9 built in the optical pickup 2.

To allow the optical pickup 2 to jump over multiple tacks in the radial direction θr across the disc DSC, the analog switch 19d is turned ON and OFF in synchronization with the rectangular signal SB, thereby generating a tracking servo signal Sts for jumping over multiple tracks while performing brake control to allow the drive circuit 2a to supply to a drive coil 2b the brake control current IB which is proportional to the variation in amplitude of the tracking servo signal Sts.

The control circuit 20 allows the microprocessor (MPU) to execute the system program stored in advance, thereby controlling the entire operation of the signal processing circuit 3.

Next, an example of random access operation of the write device and the read device, having such a configuration, according to this embodiment is explained with reference to the flow charts in FIGS. 9 and 10.

Figure 9:
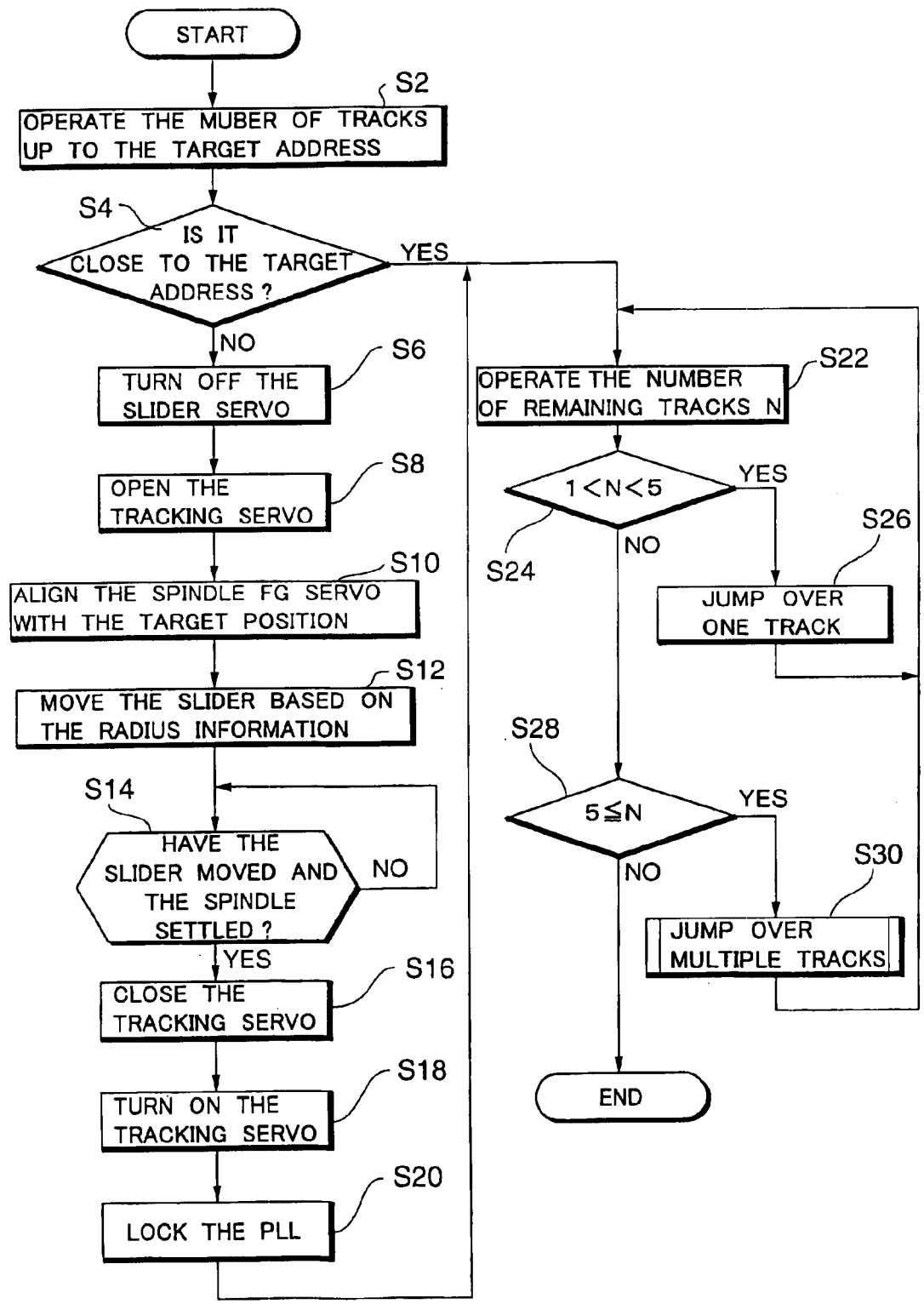
FIG. 9 is a flow chart illustrating an example of operation according to an embodiment.

Referring to FIG. 9, when random access is started, the control circuit 20 first calculates the number of tracks from the current address to the target address (step S2). Then, based on the number of tracks obtained, it is determined whether or not the distance to the target address is close (step S4). For example, a threshold value of 1000 tracks is predetermined. If the number of tracks obtained is less than the threshold value, it is judged that the distance is close and "YES" is chosen, and then the process moves on to step S22. If the number of tracks obtained is greater than the threshold value, it is judged that the distance is far and "NO" is chosen, and then the process moves on to step S6.

In step S6, a slider servo is turned OFF which performs servo-control on the slider to move the pickup 2 in the radial direction θr across the disc DSC. In step S8, a tracking servo which performs servo control on the objective lens 9 of tie optical system 4 is driven to an open state (OFF state).

As such, the slider servo and the tacking servo are turned OFF and thereafter the servo FG of the spindle motor 1 is aligned with the target position to obtain a rotational speed corresponding to the position of the pickup 2 in the radial direction θr of the disc DSC (step S10). For example, to allow the pickup 2 to move from inner circumference toward outer circumference of tie disc DSC, the number of revolutions of the spindle motor 1 is decreased, whereas the number of revolutions of the spindle motor 1 is increased when allowing the pickup 2 to move from outer circumference toward inner circumference of the disc DSC.

Next, in step S12, the slider is started to move, with the slider servo being kept OFF. That is, the slider is moved to the vicinity of the target address at once while the on-track signals DOT are being counted which are generated in accordance with the reflected beams from the grooves G and lands L formed on the disc DSC.

Then, in step S14, the process waits until the slider reaches the position corresponding to the target address and the spindle motor 1 settles the number of revolutions corresponding to the position. When the slider has reached the position corresponding to the target address and the spindle motor 1 has settled to the number of revolutions corresponding to the position, the tracking servo is driven to a closed state (ON state) in step S16 and the slider servo is driven to a closed state (ON state) in step S18. In addition, in step S20, the PLL is locked to generate a clock in accordance with the RF signal SRF read from the disc DSC, then the process moves on to step S22.

In step S22, the number of remaining tracks N up to the target address is operated. Next, in step S24, it is determined whether the number of remaining tracks N satisfies the condition that is $1 \leq N < 5$. If the condition is satisfied (or in the case of "YES"), the pickup 2 is determined to have reached a position very close to the target address and then the process moves on to step S26.

In step S26, the pickup 2 is moved by one track. Then, the process in steps S22, S24, and S26 is repeated to allow the pickup 2 to move to the track of the target address.

Figure 10:
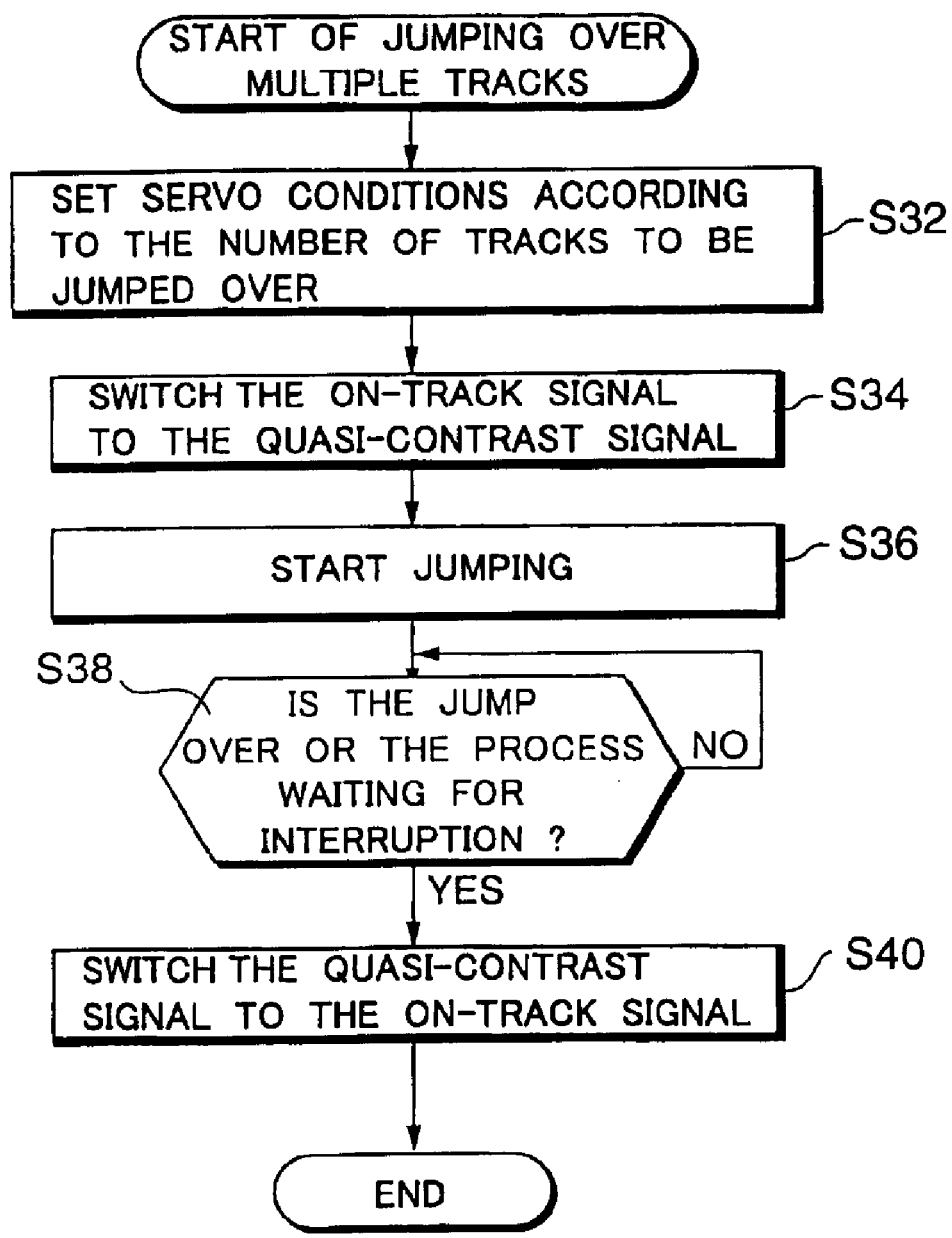
FIG. 10 is a flow chart illustrating another example of operation according to an embodiment.

On the other hand, if the number of remaining tracks N up to the target address, determined in step S22, is such that 5≦N, the Process moves on to step S30 to jump over multiple tracks as shown in FIG. 10. First, in step S32 of FIG. 10, conditions of servo control are determined in accordance with the number of jumped tracks (remaining tracks) N. Next, in step S34, the selector circuit 18 is switched to supply the quasi-contrast signal DFM to the servo signal processing circuit 19 instead of the on-track signal DOT. Then, in step S36, multiple tracks start to be jumped over.

When multiple tracks have started to be jumped over, carried out are speed control for making constant the frequency of the quasi-contrast signal DFM at the zero-cross position and counting tracks. Then, when the number of remaining tracks N has been counted, an interruption signal which tells the completion of the jumping over multiple tracks is outputted from the servo signal processing circuit 19 to the control circuit 20. In step S38, the jumping over of multiple tracks is carried out until the interruption signal is supplied to the control circuit 20. When the interruption signal has been supplied to the control circuit 20, the process moves on to step S40 to switch the selector circuit 18 and then supply the on-track signal DOT to the servo signal processing circuit 19 instead of supplying the quasi-contrast signal DFM. Incidentally, in step S40, half-wave brake control, as described later, is carried out so that the pickup 2 does not move beyond the track of the target address.

Then, when the pickup 2 has been positioned at the track of the target address, the random access is over.

Incidentally, in step S34, the quasi-contrast signal takes its place to start the jumping and then the on-track signal takes its place when the jumping is coming to an end (in step S40). This is because the speed of crossing tracks becomes slower as the search is coming to an end and the tracking error signal may be inverted if a speed, opposite in direction and exceeding in magnitude of the speed of crossing tracks, is applied due to an eccentric component in the radial direction, so that the quasi-contrast signal cannot be generated correctly in accordance with the tracking error signal.

Figure 11:
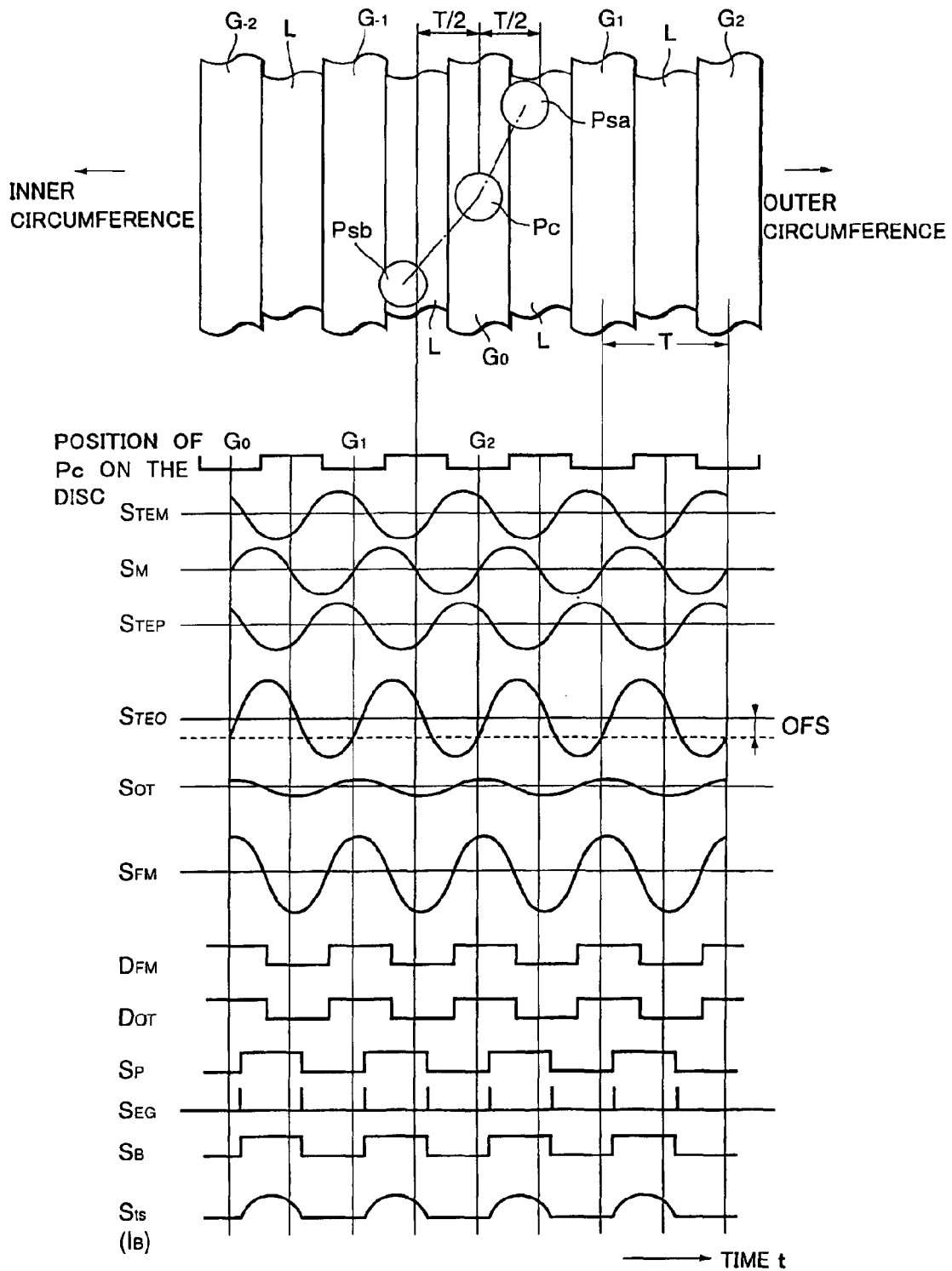
FIG. 11 shows the waveforms of signals generated when light spots move outwardly toward outer circumference of the disc.

FIG. 11 illustrates the waveform of signals generated when the pickup 2 moves from inner circumference toward outer circumference of the disc DSC in accordance with the flow charts of FIGS. 9 and 10, as described above. That is, illustrated is the waveform of the push-pull signal STEM which is generated in accordance with the reflected beam Psar generated when the movement of the pickup 2 causes the main light spot Pc and the sub light spots Psa, Psb to move from inner toward outer circumference of the disc DSC (from G0 toward G2 in FIG. 11). Also illustrated are the waveforms of the push-pull signal SM generated in accordance with the reflected beam Pcr, the push-pull signal STEP generated in accordance with the reflected beam Psbr as well as the Push-pull signal STEP, the on-track signal SOT, and the quasi-contrast signal SFM. In addition, illustrated are the waveforms of the binary on-track signal DOT and the binary quasi-contrast signal DFM. Furthermore, illustrated are the waveforms of the rectangular signal SP, the pulse signal SEG, the rectangular signal SB, the tracking servo signal Sts, and the brake control current IB, which are shown in FIG. 8.

Referring to FIG. 11, the main light spot Pc and the sub light spots Psa, Psb are shifted to radiate the disc DSC as described above. Accordingly, the push-pull signals STEM, SM, and STEP are not in synchronization with the phase of the grooves G and the lands L but are provided with a waveform shifted from the phase of the grooves G and lands L. Accordingly, even in a case where a non-recorded area on the disc DSC is jumped over, the contrast signal SFM generated from the push-pull signals STEN, SM, and STEP indicates a change in amplitude corresponding to the shape of the groove G and the land L.

That is, suppose that the non-recorded area is jumped over on the disc DSC, the push-pull signals STEM, SM, and STEP have a waveform in synchronization with the phase of the groove G and the land L, and the push-pull signals STEM, SM, and STEP generate the contrast signal SFM. Then, the push-pull signals STEM, SM, and STEP cancel out each other and thus the amplitude of the contrast signal SFM becomes substantially zero, never providing the waveform illustrated in the figure.

However, in this embodiment, the main light spot Pc and the sub light spots Psa, Psb are shifted to radiate the disc DSC. Accordingly, the generation of the contrast signal SFM from the push-pull signals STEM, SM, and STEP do not cause the push-pull signals STEM, SM, and STEP to cancel out each other, thereby providing the contrast signal SFM which indicates the shape of the groove G and the land L with accuracy.

Consequently, this makes it possible to measure the displacement of the pickup 2 in the radial direction θr in accordance with the contrast signal SFM, enabling the pickup 2 to move to the track of the target address quickly and accurately.

Furthermore, the tracking servo signal Sts and the brake control current IB for brake control, described in step S40 of FIG. 10, are separated from the tracking error signal STEO in synchronization with the time at which the rectangular signal SB takes on logic "H". Accordingly, the tracking servo signal Sts and the brake control current IB has the shape of a half-wave synchronized with a half-wave period during which the tracking error signal STEO takes on a Plus amplitude. The shape of a half-wave makes it possible to brake the movement of the pickup 2, preventing the pickup 2 from moving at excessive speeds. Therefore, in step S40 of FIG. 10, the pickup 2 can be settled quickly to the track position of the target address.

Figure 12:
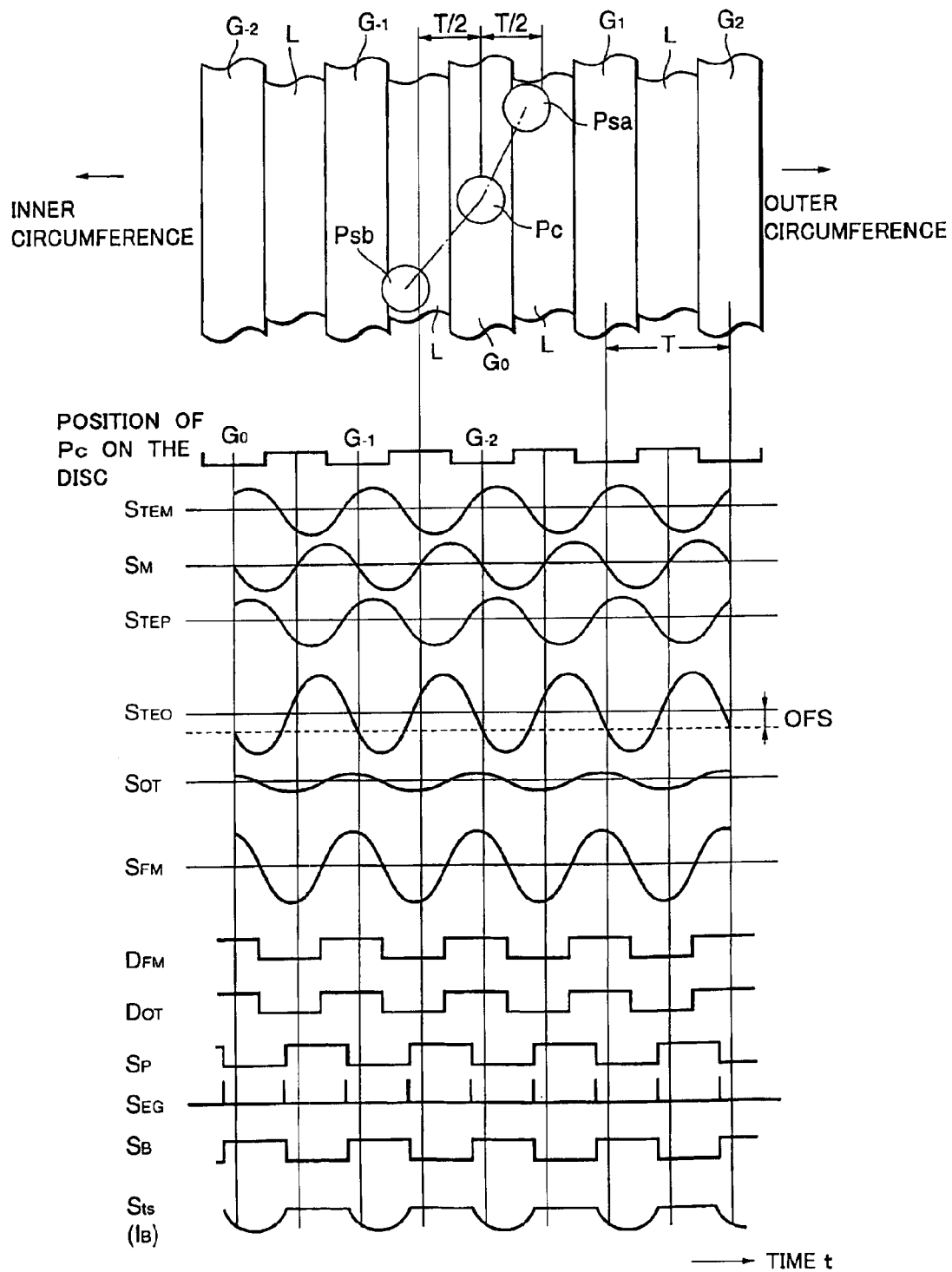
FIG. 12 shows the waveforms of signals generated when light spots move inwardly toward inner circumference of the disc.

FIG. 12 illustrates the waveforms of signals generated when the pickup 2 moves from outer toward inner circumference of the disc DSC (from G0 to G2 in FIG. 12). That is, corresponding to FIG. 11, illustrated are the waveforms of signals generated when the movement of the pickup 2 causes the main light spot Pc and the sub light spots Psa, Psb to move from outer to inner circumference of the disc DSC.

In this case, the main light spot Pc and the sub light spots Psa, Psb are also shifted to radiate the disc DSC as described above. Accordingly, the push-pull signals STEM, SM, and STEP are not in synchronization with the phase of the grooves G and the lands L but are provided with a waveform shifted from the phase of the grooves G and lands L. This makes it possible to provide the contrast signal SFM which varies the amplitude in accordance with the shape of the groove G and the land L.

Consequently, this makes it possible to measure the displacement of the pickup 2 in the radial direction θr in accordance with the contrast signal SFM, enabling the pickup 2 to move to the track of the target address quickly with accuracy.

Furthermore, the tracking servo signal Sts and the brake control current IB for brake control, described in step S40 of FIG. 10, are separated from the tracking error signal STEO in synchronization with the time at which the rectangular signal SB takes on logic "H". Accordingly, the tracking servo signal Sts and the brake control current IB has the shape of a half-wave synchronized with a half-wave period during which the tracking error signal STEO takes on a minus amplitude. The shape of a half-wave makes it possible to brake the movement of the pickup 2, preventing the pickup 2 from moving at excessive speeds. Therefore, in step S40 of FIG. 10, the pickup 2 can be settled quickly to the track position of the target address.

Incidentally, in the aforementioned explanation, the half-wave brake control is performed in step S40 of FIG. 10, however, the half-wave brake control may be carried out from the time at which the jumping over multiple tracks is started.

In addition, in the example illustrated in FIGS. 11 and 12, the tracking error signal STEO includes an offset OFS corresponding to the shift of the push-pull signals STEM, SM, and STEP described in the foregoing. The off-set adder circuit 15 adds this amount of offset to the tracking error signal STEO, thereby making it possible to cancel out the offset of the tracking error signal STEO.

In addition, with the flow chart of FIG. 10, such a case was explained in which tracks are counted up to the predetermined tracks to be jumped over (step S38) and thereafter the quasi-contrast signal DFM is switched to the on-track signal DOT in step S40. The quasi-contrast signal DFM may be switched to the on-track signal DOT when the number of tracks obtained by subtracting a given number of tracks from the aforementioned predetermined number of tracks to be jumped over has been counted.

Figure 13:
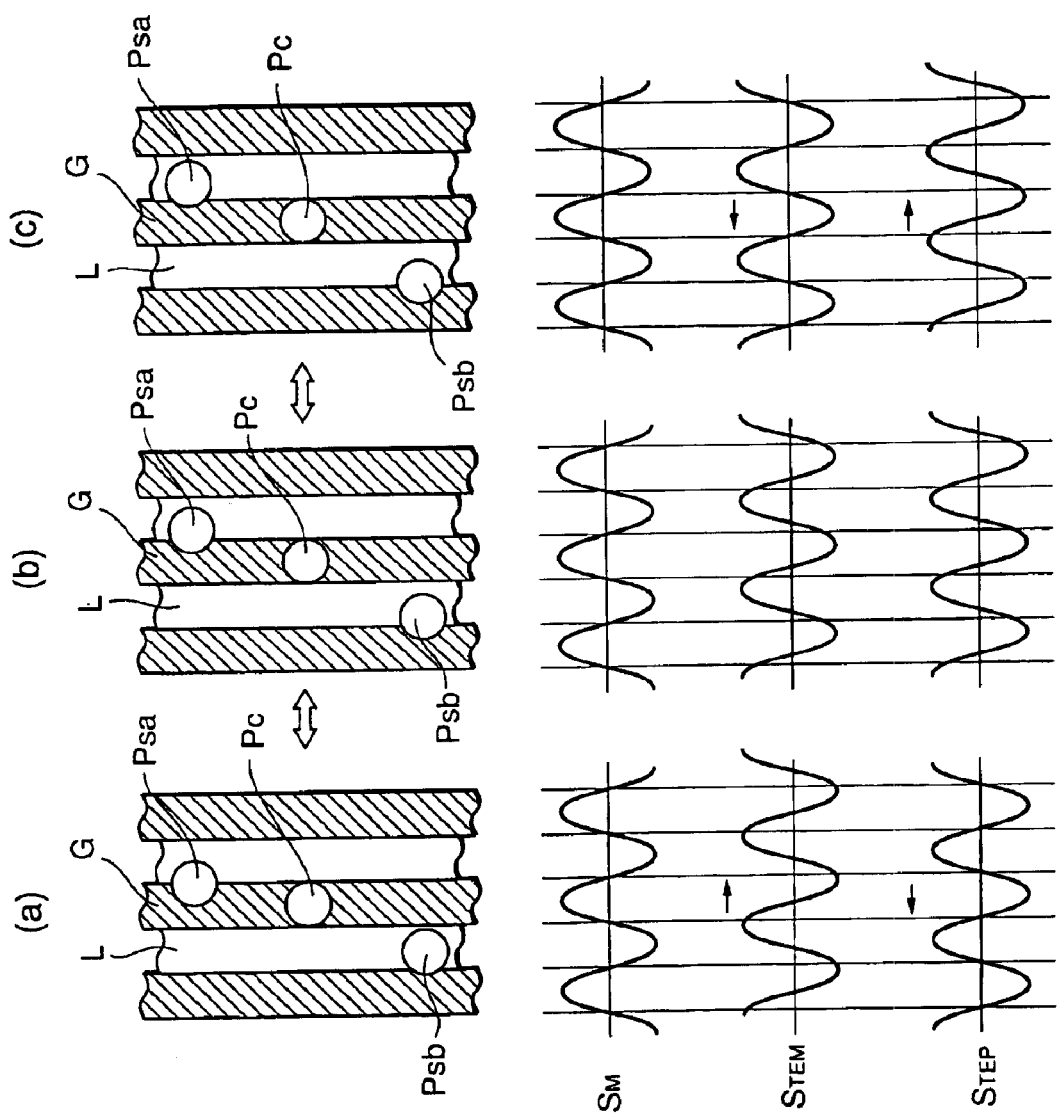
FIG. 13 is an explanatory view illustrating the effects obtained by an embodiment.

Moreover, suppose that warping or strain exists in the recording surface of the disc DSC or the disc DSC is eccentrically rotated. In this case, the main light spot Pc and the sub light spots Psa, Psb are dislocated from the normal position relative to the groove G and the land L. However, even in such a case, the accurate push-pull signals STEM, SM, and STEP can be obtained. For example, as shown in FIG. 13(b), when neither warping nor strain exists in the recording surface of the disc DSC or the disc DSC is not eccentrically rotated, the main light spot Pc and the sub light spots Psa, Psb are to radiate the grooves G and the lands L with the predetermined normal positional relationship between the main light spot Pc and the sub light spots Psa, Psb being maintained. In contrast, when warping or strain exists in the recording surface of the disc DSC or the disc DSC is eccentrically rotated, the sub light spots Psa, Psb are dislocated from the normal position relative to the main light spot Pc as shown in FIGS. 13(a) and 13(c).

However, as shown in the lower portion of FIGS. 13(a) and 13(c), the push-pull signals STEM and STEP which are generated in accordance with the reflected light caused by the radiation with the sub light spots Psa, Psb are shifted in phase in the opposite direction due to warping or strain of the aforementioned recording surface. The on-track signal generating circuit 14 illustrated in FIG. 7 performs additive averaging operation on the push-pull signals STEM and STEP. The error components generated in the push-pull signals STEM and STEP due to the warping, strain, or eccentricity of the aforementioned recording surface are cancelled out, and thus the on-track signal SOT (DOT) is generated which is not affected by the error components. Consequently, the position of the pickup 2 can be controlled with accuracy in accordance with the on-track signal SOT (DOT). That is, such an information write device and an information read device (so-called "robust" device) can be implemented which are stable under the circumstances where warping or strain exists in the recording surface of the disc DSC or the disc DSC is eccentrically rotated.

Figure 14:
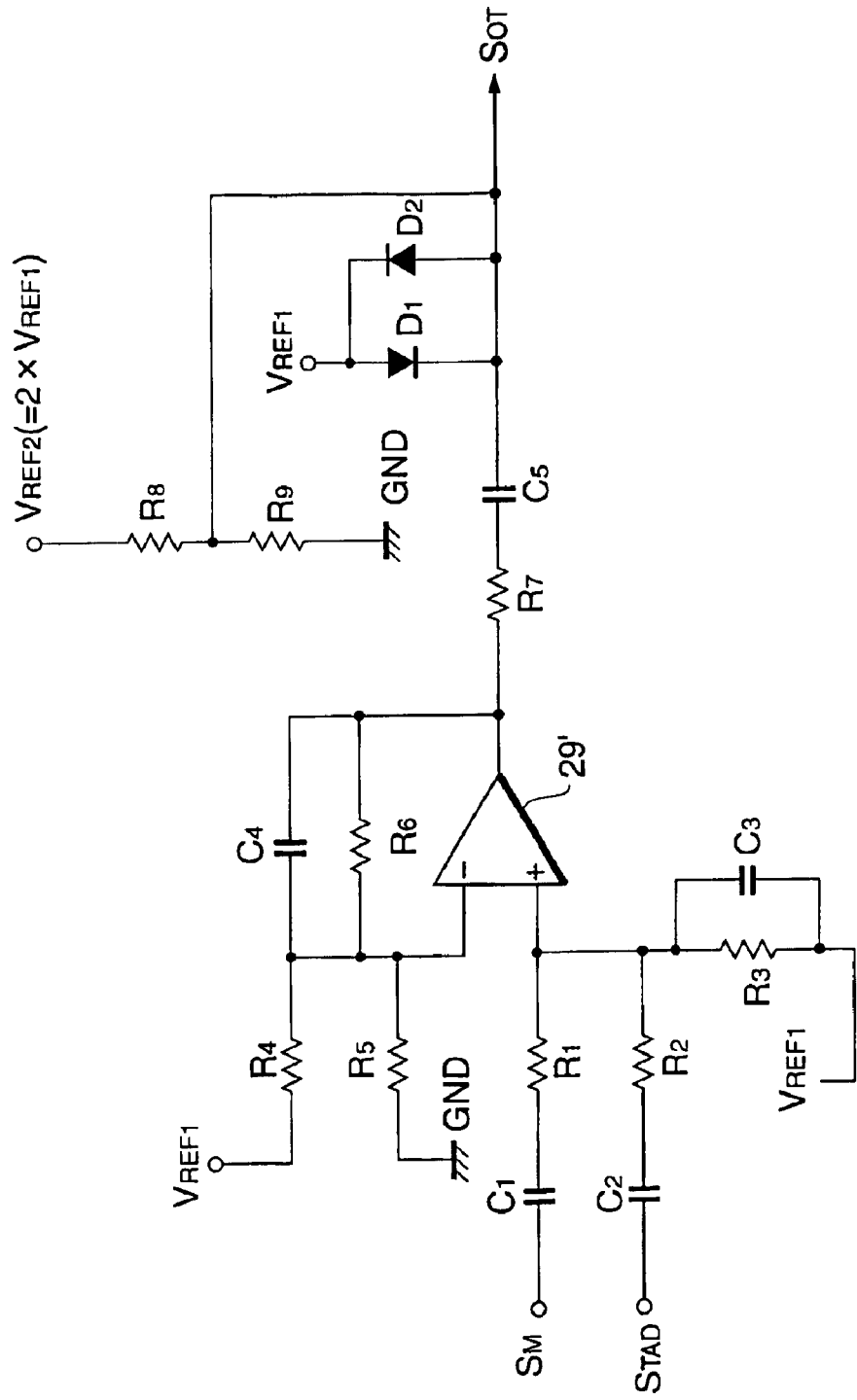
FIG. 14 is a circuit diagram illustrating a modified example of an on-track signal generating circuit.

Incidentally, in this embodiment, the aforementioned on-track signal generating circuit 14 may be replaced with the circuit of the configuration shown in FIG. 14. That is, the on-track signal generating circuit of FIG. 14 has a configuration equivalent to the aforementioned on-track signal generating circuit 14 because of a differential amplifier 29', and the resistors R1–R6 and capacitors C1–C4 connected thereto.

In addition, the resistor R7 and capacitor C5 are connected in series to the output of the differential amplifier 29', and diodes D1, D2 are connected so as to be biased oppositely to each other between the capacitor C5 and a predetermined source voltage VREF1. Moreover, the capacitor C5 is connected to dividing resistors R8, R9, and the on-track signal SOT is adapted to be outputted to the common contact of the capacitor C5 and the dividing resistors R8, R9.

Figure 15:
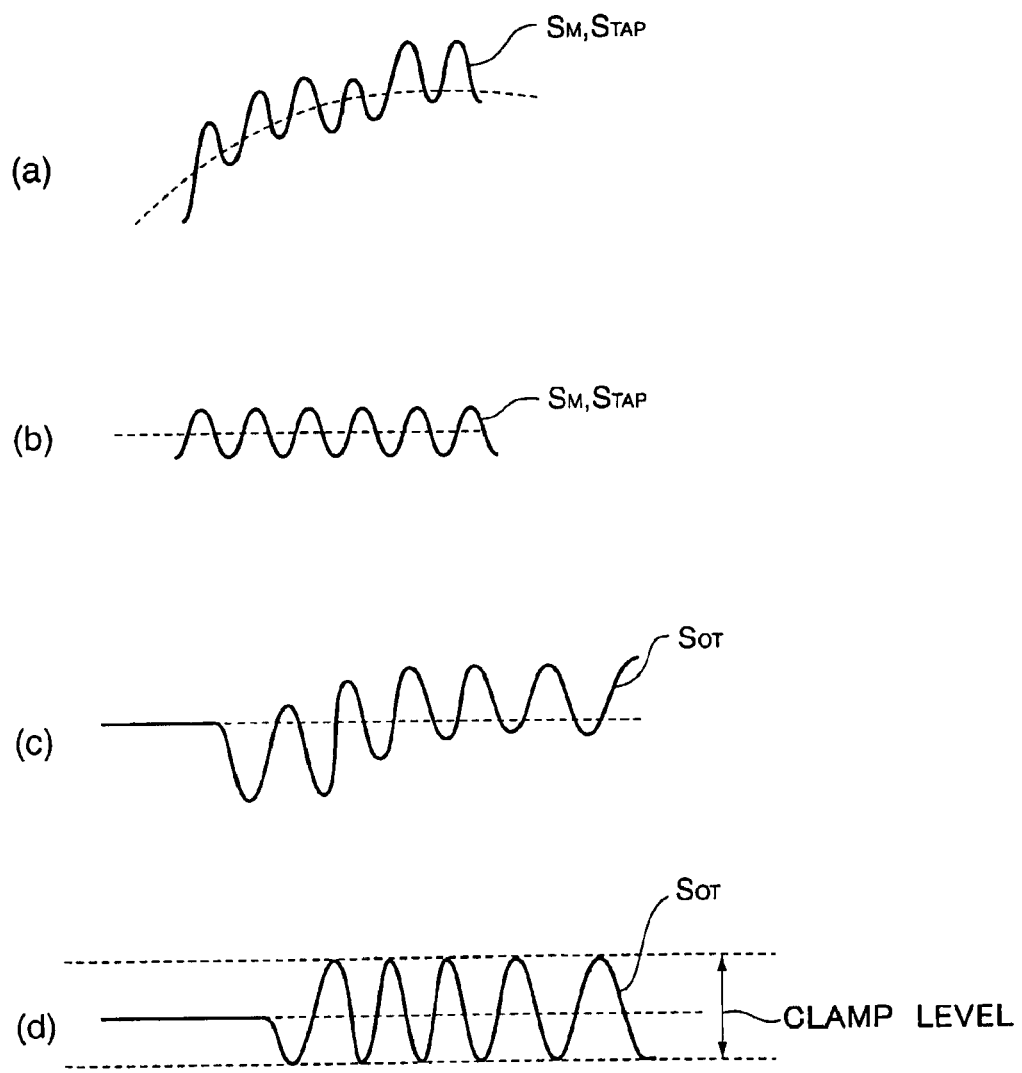
FIG. 15 is an explanatory view illustrating the effects obtained by the on-track signal generating circuit shown in FIG. 14.

According to the on-track signal generating circuit having such a circuit configuration, the Push-pull signal SM is inputted to the differential amplifier 29' via a high-pass filter comprising the resistor R1 and a capacitor C1, while the addition signal STAD is inputted to the differential amplifier 29' via a high-pass filter comprising the resistor R2 and the capacitor C2. As shown in FIG. 15(a). Suppose that warping or strain present on the recording surface of the disc DSC would cause a noise component of a low frequency (an offset component) to be superimposed on the push-pull signal SM and the addition signal STAD. Even in this case, the aforementioned high-pass filters make it possible to remove the offset component as shown in FIG. 15(b). Then, the push-pull signal SM and the addition signal STAD, having no offset components, are supplied to the non-inverting input terminal of the differential amplifier 29' to be thereby added and generated the on-track signal SOT.

Furthermore, the diodes D1, D2 constitute a diode clamp circuit. Suppose that the tracking servo is turned OFF between step S6 to S14 of FIG. 9, described above, and thereafter the tracking servo is turned ON again in step S16. In this case, even when a variation in amplitude of the on-track signal SOT outputted from the differential amplifier 29' under the transition state occurs as shown in FIG. 15(c), the configuration makes it possible to allow the amplitude of the on-track signal SOT to lie always within a constant range of clamp level as shown in FIG. 15(d). Consequently, this makes it possible to increase the accuracy of the tracking servo control.

Figure 16:
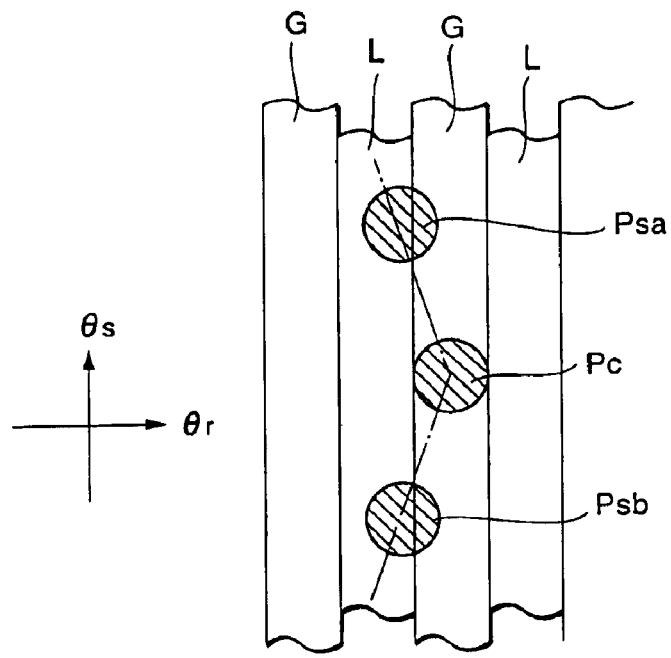
FIG. 16 is an explanatory view illustrating other positions to be radiated by light spots.
Figure 17:
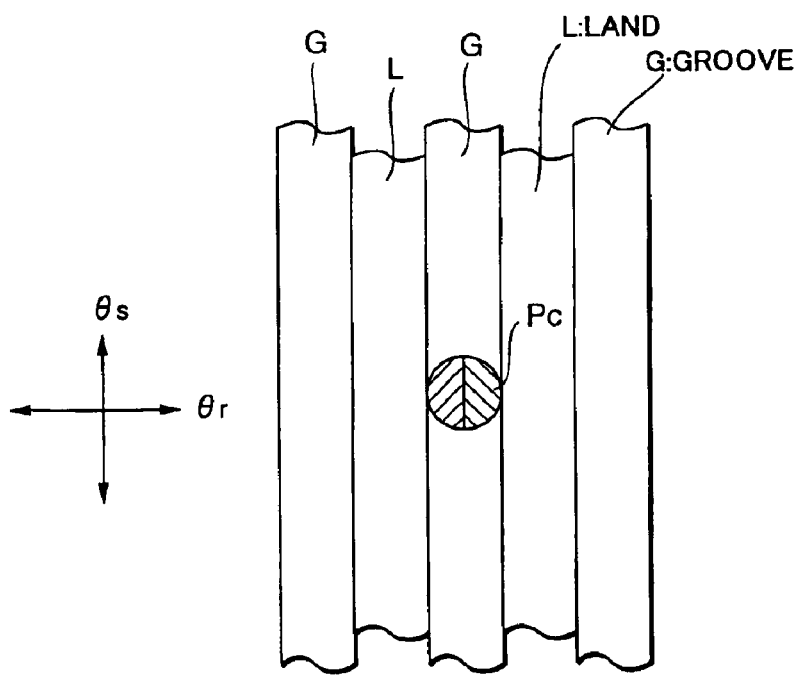
FIG. 17 is an explanatory view illustrating the position to be radiated by a prior-art light spot.
Figure 18:
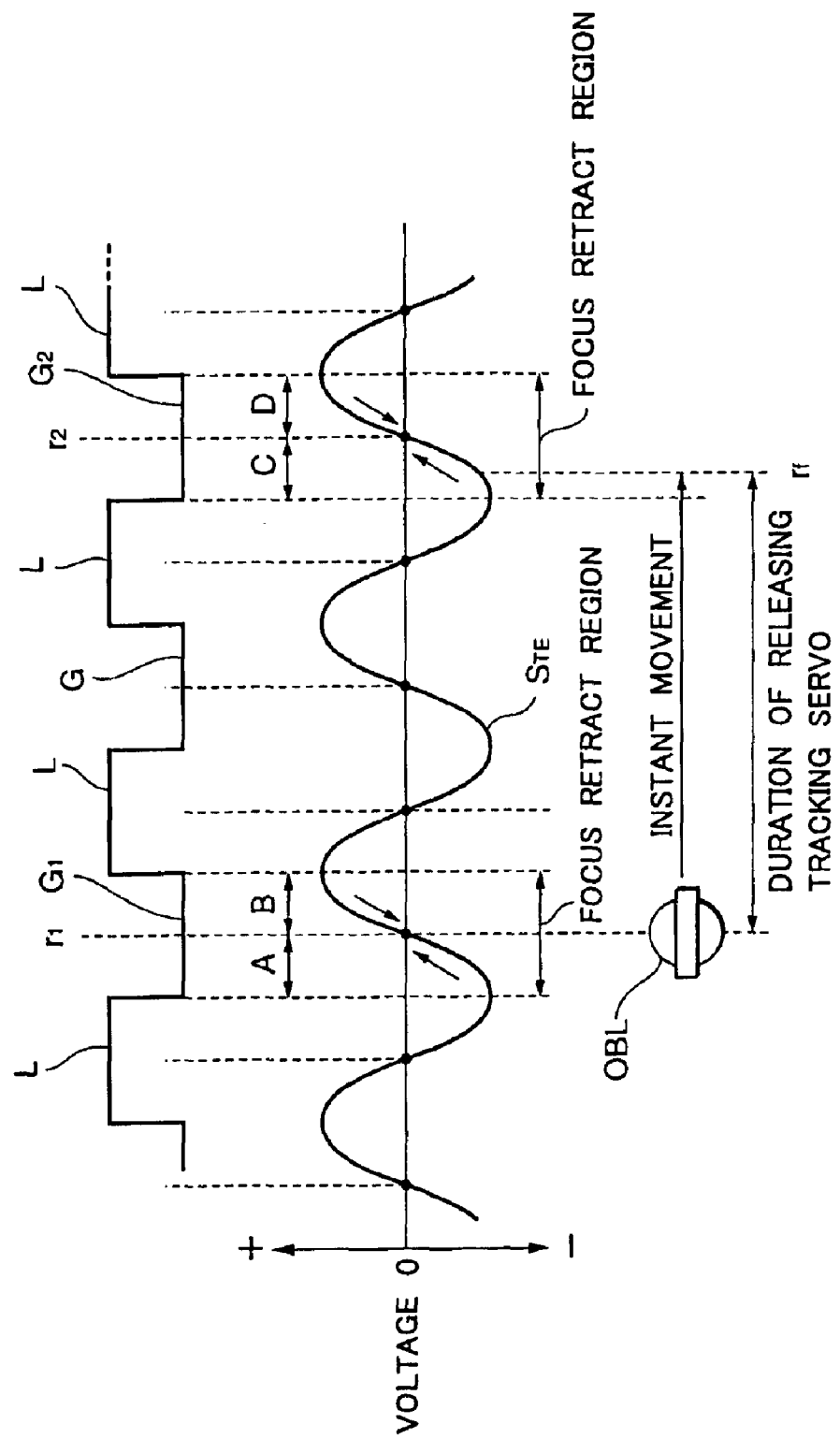
FIG. 18 is an explanatory view illustrating the problem of jumping over tracks in a prior art.
Figure 19:
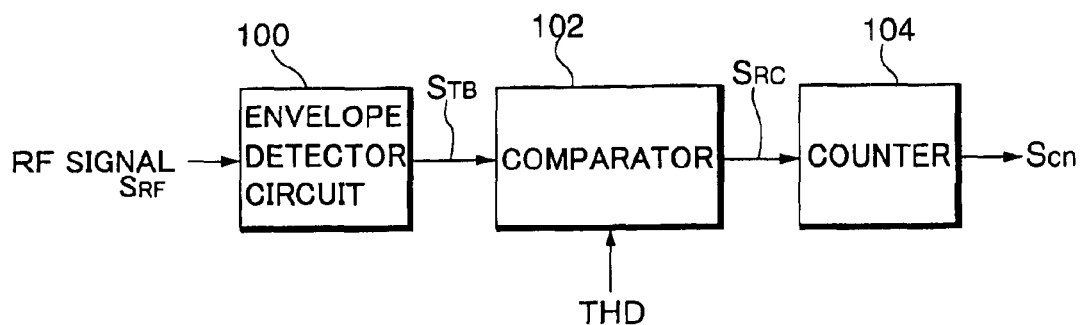
FIG. 19 is a block diagram illustrating the configuration of a circuit employed for the control of jumping over tracks according to the prior art.
Figure 20:
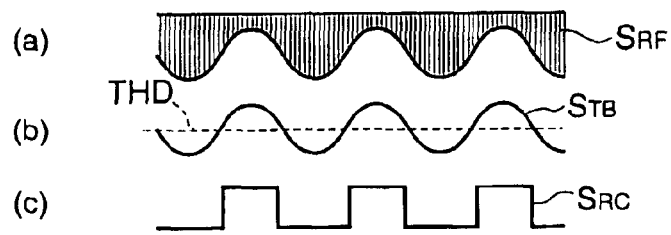
FIG. 20 is an explanatory view illustrating the problem of a contrast signal according to the prior art.

In addition, in the aforementioned embodiment, such a case has been explained in which the sub light spots Psa, Psb radiate the both sides about the main light spot Pc in the radial direction θr as shown in FIG. 6(a). However, the present invention is not limited thereto. For example, as shown in FIG. 16, the sub light spots Psa, Psb may be adapted to radiate only one side about the main light spot Pc in the radial direction θr. Incidentally, suppose that the main light spot Pc and the sub light spots Psa, Psb are allowed radiation in a positional relationship as shown in FIG. 16. This can be implemented only by inclining the optical system 4 and the optical detector 5 as a whole in a predetermined direction relative to the disc DSC while allowing the positional relationship between the optical system 4 and the optical detector 5 unchanged.

Furthermore, the grating 7 may be rotated from the state of FIG. 6(a) to that of FIG. 6(b). However, the sub light spots Psa, Psb are so adjusted to radiate a position shifted from the center of the land L when the main light spot Pc lies at the center of the groove G.

Then, the main light spot Pc and the sub light spots Psa, Psb are allowed radiation under the positional relationship as shown in FIG. 16 and the on-track signal SOT (DOT) is generated in accordance with the reflected beams Pcr, Psar, Psbr, which are reflected from the disc DSC. As shown in FIGS. 11 and 12, the on-track signal SOT (DOT) can thereby be generated which specify the shape of groove G and the land L with accuracy.

In addition, one or two or more sub light spots may be employed. That is, as a condition, at least one sub light spot may be employed in conjunct ion with the main tight spot Pc so long as the sub light spot is adapted to radiate a position shifted from the center of the land L when the main light spot Pc lies at the center of the groove G.

As described above, according to the present invention, when at least one of two light spots for radiating information recording track and guide tracks radiates an information recording track, the other light spot is adapted to radiate a portion shifted from the center of the information recording track and the guide track. A contrast signal can thereby be generated which specifies the shape of the information recording track and the guide track in accordance with the reflected beam of light.

Consequently, when random access is carried out, the contrast signal can be applied to know the position of the pickup with accuracy, and thus such an information write device and an information read device can be realized which enable quick access to an information recording medium.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An information write device comprising:
   optical system means for radiating information recording tracks and guide tracks with at least two light spots;
   optical detector means for detecting each of reflected beams of light generated by the radiation of each of said light spots;
   a pickup for moving said optical system means along a direction of arrangement of said information recording tracks and said guide tracks;
   signal generating means for generating each of push-pull signals in accordance with each of detection signals outputted from the optical detector means when said pickup moves along the direction of arrangement of said information recording tracks and said guide tracks; and
   operational means for generating a contrast signal, having contrast information in the direction of arrangement of said information recording tracks and said guide tracks, by adding the push-pull signals corresponding to said at least two light spots;
   wherein said optical system means allows one of said at least two light spots to radiate said information recording track and at the same time the other light spot to radiate a portion displaced from the center of said information recording track or said guide track, and
   wherein said optical system means further includes at least one additional light spot, non-collinear with said at least two light spots.

2. The information write device according to claim 1, wherein said optical system means comprises:
   a grating for diffracting beams of light emitted from a light source; and
   a prism for generating said at least two light spots by refracting at least two diffracted beams of light (defracted by said grating) at a predetermined angle of refraction, and for radiating said information recording track with one of said at least two light spots and, at the same time, for radiating a portion displaced from the center of said information recording track or said guide track with the other light spot.

3. The information write device according to claim 2, wherein angles of incidence of said at least two diffracted beams of light emitted from said grating to be incident on said prism are different from each other.

4. The information write device according to any one of claims 1 to 3, further comprising determination means for determining a positional relationship between said pickup and a target position in accordance with said contrast signal immediately before said pickup reaches at least said target position when said pickup is allowed to move to the target position along said direction of arrangement.

5. The information write device according to any one of claims 1 to 3, further comprising:
   amplifier means for adding and amplifying, with a predetermined amplification factor, push-pull signals corresponding to remaining light spots except for a push-pull signal corresponding to one of said at least two light spots; and
   subtracter means for performing subtraction between the signal amplified by said amplifier means and the push-pull signal corresponding to one of said at least two light spots,
   wherein the signal generated by said subtracter means is employed as a tracking error signal to perform tracking servo control on said pickup.

6. The information write device according to any one of claims 1 to 3, wherein said amplification factor is set to a ratio K/n, in which K is a ratio of intensity of a remaining light spot to intensity of said one light spot, n is the number of said remaining light spots.

7. The information write device according to any one of claims 1 to 3, wherein the total number of said light spots is three.

8. An information read device comprising:
   optical system means for radiating information recording tracks and guide tracks with at least two light spots;
   optical detector means for detecting each of reflected beams of light generated by the radiation of each of said light spots;
   a pickup for moving said optical system means along a direction of arrangement of said information recording tracks and said guide tracks;
   signal generating means for generating each of push-pull signals in accordance with each of detection signals outputted from the optical detector means when said pickup moves along the direction of arrangement of said information recording tracks and said guide tracks; and
   operational means for generating a contrast signal, having contrast information in the direction of arrangement of said information recording tracks and said guide tracks, by adding the push-pull signals corresponding to said at least two light spots,
   wherein said optical system means allows one of said at least two light spots to radiate said information recording tracks and at the same time the other light spot to radiate a portion displaced from the center of said information recording track or said guide track, and
   wherein said optical system means further includes at least one additional light spot, non-collinear with said at least two light spots.

9. The information read device according to claim 8, wherein said optical system means comprises:

a grating for diffracting beams of light emitted from a light source; and a prism for generating said at least two light spots by refracting at least two diffracted beams of light (defracted by said grating) at a predetermined angle of refraction, and for radiating said information recording track with one of said at least two light spots and, at the same time, for radiating a portion displaced from the center of said information recording track or said guide track with the other light spot.

10. The information read device according to claim 9, wherein angles of incidence of said at least two diffracted beams of light emitted from said grating to be incident on said prism are different from each other.

11. The information read device according to any of claims 8 to 10, further comprising determination means for determining a positional relationship between said pickup and a target position in accordance with said contrast signal immediately before said pickup reaches at least said target position when said pickup is allowed to move to the target position along said direction of arrangement.

12. The information read device according to any one of claims 8 to 10, further comprising:

amplifier means for adding and amplifying, with a predetermined amplification factor, push-pull signals corresponding to remaining light spots except for a push-pull signal corresponding to one of said at least two light spots; and subtracter means for performing subtraction between the signal amplified by said amplifier means and the push-pull signal corresponding to one of said at least two light spots, wherein the signal generated by said subtracter means is employed as a tracking error signal to perform tracking servo control on said pickup.

13. The information read device according to any one of claims 8 to 10, wherein said amplification factor is set to a ratio K/n, in which K is a ratio of intensity of a remaining light spot to intensity of said one light spot, n is the number of said remaining light spots.

14. The information read device according to any one of claims 8 to 10, wherein the total number of said light spots is three.

* * * * *